(12) United States Patent
Ahn et al.

(10) Patent No.: US 12,346,166 B2
(45) Date of Patent: Jul. 1, 2025

(54) DISPLAY APPARATUS AND ELECTRONIC APPARATUS INCLUDING THE SAME

(71) Applicant: Samsung Display Co., Ltd., Yongin-si (KR)

(72) Inventors: Jaeho Ahn, Asan-si (KR); Taewoong Kim, Seongnam-si (KR); Jin Hwan Choi, Seoul (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 256 days.

(21) Appl. No.: 18/094,638

(22) Filed: Jan. 9, 2023

(65) Prior Publication Data

US 2023/0315155 A1    Oct. 5, 2023

(30) Foreign Application Priority Data

Mar. 15, 2022 (KR) .......................... 10-2022-0031740

(51) Int. Cl.
*G06F 1/16* (2006.01)

(52) U.S. Cl.
CPC .......... *G06F 1/1652* (2013.01); *G06F 1/1656* (2013.01)

(58) Field of Classification Search
CPC .... G06F 1/1652; G06F 1/1656; G06F 1/1624; G06F 1/1637; G06F 1/1626
See application file for complete search history.

(56) References Cited

U.S. PATENT DOCUMENTS

| 7,027,110 | B2* | 4/2006 | Akiyama | G02F 1/133305 |
| | | | | 349/58 |
| 10,061,358 | B2* | 8/2018 | Lee | H04M 1/0237 |
| 10,809,552 | B2 | 10/2020 | Park et al. | |
| 10,866,618 | B2 | 12/2020 | Yeom | |
| 11,940,849 | B2* | 3/2024 | Choi | G06F 1/1652 |
| 2019/0064881 | A1* | 2/2019 | Kim | G06F 1/1652 |
| 2022/0078270 | A1* | 3/2022 | Song | G06F 1/1652 |
| 2022/0113765 | A1* | 4/2022 | Kang | G06F 1/16 |
| 2022/0117101 | A1* | 4/2022 | Lee | G06F 1/1624 |
| 2022/0357775 | A1* | 11/2022 | Choi | H04M 1/0268 |
| 2023/0288963 | A1* | 9/2023 | Choi | G06F 1/1652 |

FOREIGN PATENT DOCUMENTS

| CN | 113393771 A | 9/2021 |
| KR | 1020190065852 A | 6/2019 |
| KR | 1020200063801 A | 6/2020 |
| KR | 1020210041665 A | 4/2021 |

* cited by examiner

*Primary Examiner* — Abhishek M Rathod
(74) *Attorney, Agent, or Firm* — CANTOR COLBURN LLP

(57) ABSTRACT

A display apparatus includes a display panel rollable around a rolling axis extending in a first direction and a support member disposed below the display panel. The support member includes a base part, support bars each extending in the first direction, arranged in a second direction crossing the first direction, and coupled to the base part, and a protruding part including a first support portion and a second support portion, each of which is disposed below the base part and extends in the second direction. The first support portion overlaps at least a portion of first ends of the support bars, and the second support portion overlaps at least a portion of second ends of the support bars, which are spaced apart from the first ends in the first direction.

18 Claims, 22 Drawing Sheets

FIG. 2A
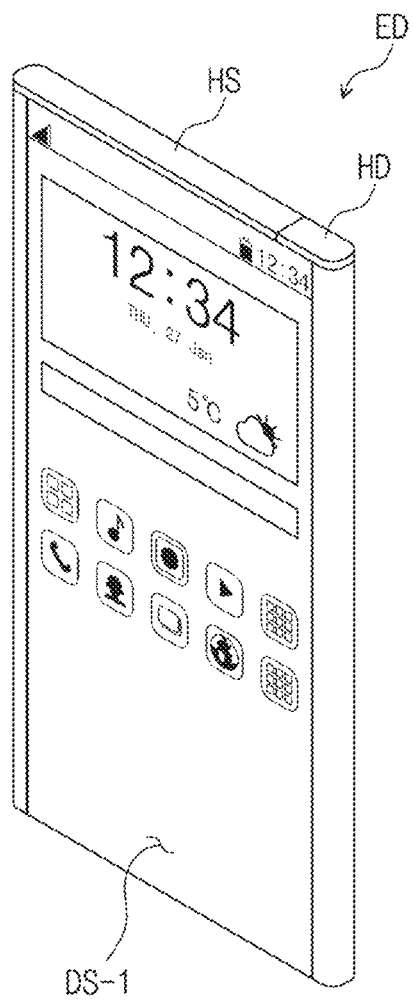
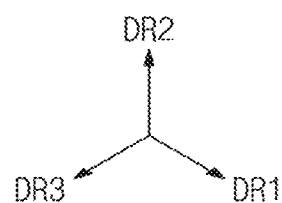

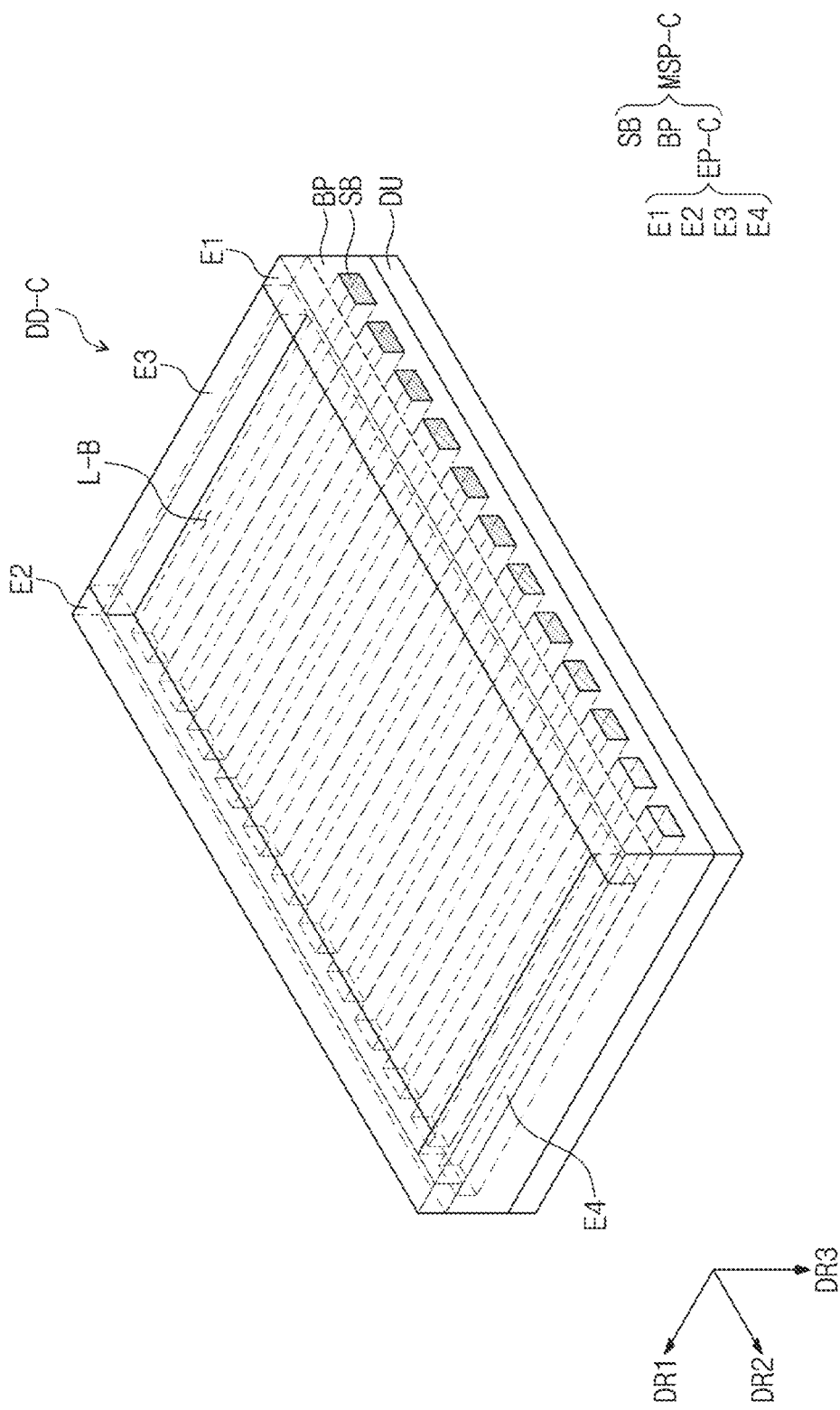

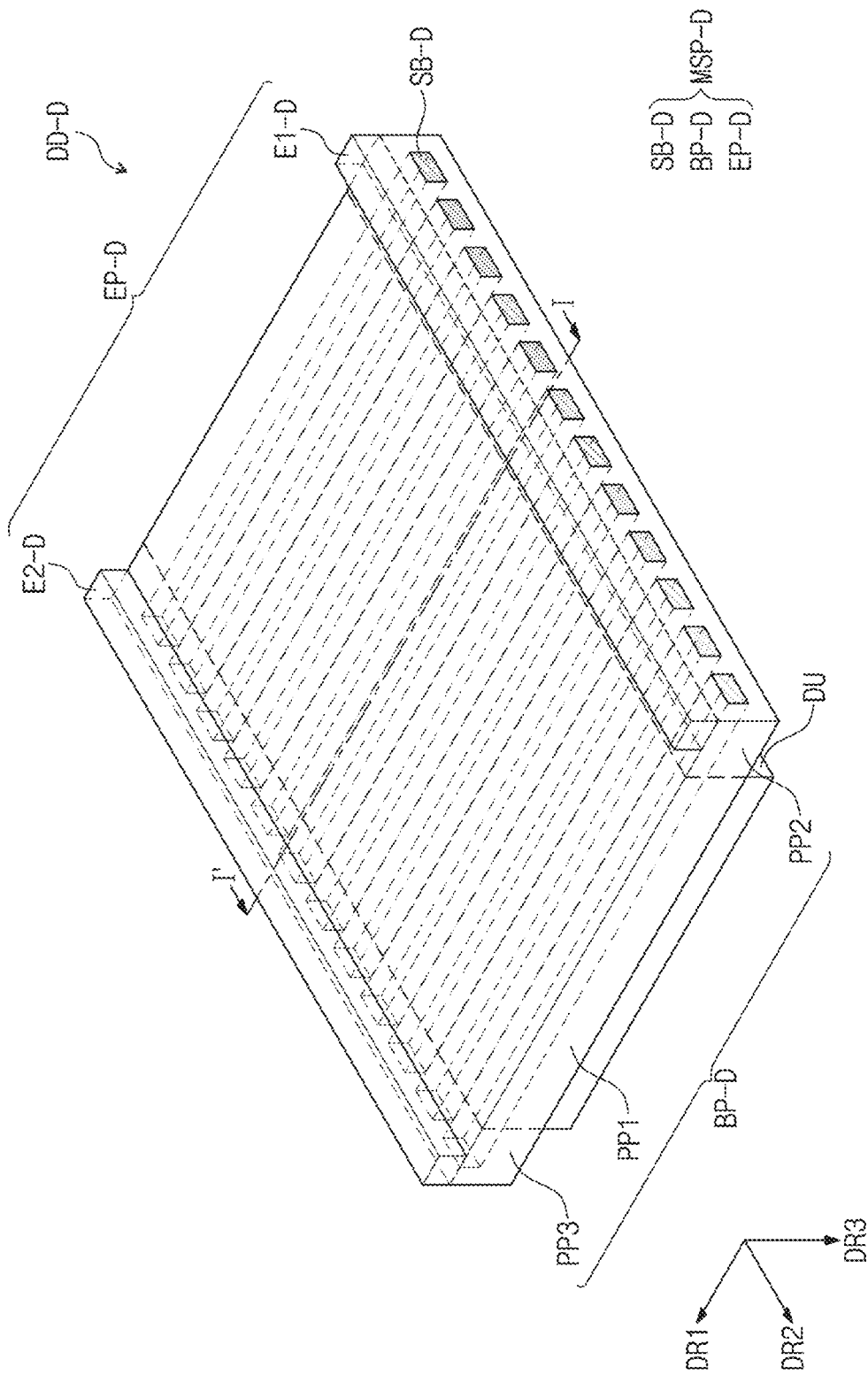

DISPLAY APPARATUS AND ELECTRONIC APPARATUS INCLUDING THE SAME

This application claims priority to Korean Patent Application No. 10-2022-0031740, filed on Mar. 15, 2022, and all the benefits accruing therefrom under 35 U.S.C. § 119, the content of which in its entirety is herein incorporated by reference.

BACKGROUND

1. Field

The disclosure herein relates to a display apparatus and an electronic apparatus including the same, and more particularly, to a rollable display apparatus and an electronic apparatus including the same.

2. Description of the Related Art

An electronic apparatus that provides an image to a user, e.g., a smartphone, a digital camera, a laptop computer, a navigation unit, and a smart television, includes a display apparatus for displaying an image. The display apparatus generates an image to provide the generated image to the user through a display screen.

In recent years, display apparatuses having various shapes are being developed as technologies of the display apparatuses are developed. A flexible display apparatus that is deformed into a curved shape or is foldable or rollable is being developed, for example. The flexible display apparatus may be highly portable and improve user's convenience.

A rollable display apparatus among the flexible display apparatuses may have a substantially small thickness to be easily rolled and thus be vulnerable to an external impact.

SUMMARY

A rollable display apparatus among the flexible display apparatuses may have a small thickness to be easily rolled and thus be vulnerable to an external impact.

The disclosure provides a display apparatus having improved impact resistance and an electronic apparatus including the same.

An embodiment of the inventive concept provides a display apparatus including a display panel that is rollable around a rolling axis extending in a first direction, and a support member disposed below the display panel. Here, the support member includes a base part, a plurality of support bars each extending in the first direction, arranged in a second direction crossing the first direction, and coupled to the base part, and a protruding part including a first support portion and a second support portion, each of which is disposed below the base part and extends in the second direction. Also, the first support portion and the second support portion are spaced apart from each other in the first direction, the first support portion overlaps at least a portion of first ends of the plurality of support bars, and the second support portion overlaps at least a portion of second ends of the plurality of support bars, which are spaced apart from the first ends in the first direction.

In an embodiment, at least a portion of each of the plurality of support bars may be disposed in the base part, and the protruding part may protrude from the base part in a direction away from the display panel.

In an embodiment, each of the plurality of support bars may include a top surface adjacent to the display panel and a bottom surface opposed to the top surface, the bottom surface of each of the plurality of support bars may be exposed from the base part, and the protruding part may contact a portion of the bottom surface of each of the plurality of support bars and protrude from the base part in a direction away from the display panel.

In an embodiment, the protruding part may overlap the display panel.

In an embodiment, the base part may include a first portion overlapping the display panel, and a second portion and a third portion that are not in overlap with the display panel and spaced apart from each other with the first portion therebetween in the first direction. Here, the first support portion may be disposed below the second portion and not overlap the display panel, and the second support portion may be disposed below the third portion and not overlap the display panel.

In an embodiment, a first stepped portion obtained by removing a portion of the base part from a top surface of the base part overlapping the first support portion in a thickness direction may be defined in the second portion, and a second stepped portion obtained by removing a portion of the base part from the top surface of the base part overlapping the second support portion in the thickness direction may be defined in the third portion.

In an embodiment, each of the first support portion and the second support portion may be provided in plural, first support portions may be spaced apart from each other in the second direction, and second support portions may be spaced apart from each other in the second direction.

In an embodiment, the first support portion may include a first sub-portion having a first thickness, and a second sub-portion having a second thickness less than the first thickness.

In an embodiment, the protruding part may further include a third support portion and a fourth support portion, each of which is disposed below the base part and extends from the first support portion to the second support portion in the first direction, and the third support portion and the fourth support portion may be spaced apart from each other in the second direction.

In an embodiment, the protruding part may have a quadrangular (e.g., rectangular) ring shape.

In an embodiment, each of the plurality of support bars may have a modulus greater than that of each of the base part and the protruding part.

In an embodiment, each of the plurality of support bars may include at least one of metal, plastic, carbon fiber, and glass fiber, and each of the base part and the protruding part may include an elastomer.

In an embodiment, the base part and the protruding part may have an integrated shape.

In an embodiment, the base part and the protruding part may include different materials from each other.

In an embodiment, the display apparatus may further include a window disposed on the display panel, an upper protection layer disposed between the window and the display panel, and a lower protection layer disposed between the display panel and the support member.

In an embodiment of the inventive concept, an electronic apparatus includes a housing, a roller disposed which is inside the housing and rotates around a rolling axis extending in a first direction, a display apparatus including a display panel and a support member disposed below the display panel, accommodated in the housing, and rollable around the roller, and a support plate disposed below the support member to support the display apparatus. Here, the support member includes a base part, a plurality of support bars each extending in the first direction, arranged in a second direction crossing the first direction, and coupled to the base part, and a protruding part including a first support portion and a second support portion, each of which is disposed below the base part and extends in the second direction. Also, the first support portion and the second support portion are spaced apart from each other in the first direction, the first support portion overlaps at least a portion of first ends of the plurality of support bars, and the second support portion overlaps at least a portion of second ends of the plurality of support bars, which are spaced apart from the first ends in the first direction.

In an embodiment, the base part and the support plate may be spaced apart from each other to define an empty space.

In an embodiment, at least a portion of each of the plurality of support bars may be disposed in the base part, and the protruding part may protrude from the base part in a direction away from the display panel.

In an embodiment, each of the plurality of support bars may include a top surface adjacent to the display panel and a bottom surface opposed to the top surface, the bottom surface of each of the plurality of support bars may be exposed from the base part, and the protruding part may contact a portion of the bottom surface of each of the plurality of support bars and protrude from the base part in a direction away from the display panel.

In an embodiment, the base part may include a first portion overlapping the display panel, and a second portion and a third portion that are not in overlap with the display panel and spaced apart from each other with the first portion therebetween in the first direction. Here, the first support portion may be disposed below the second portion and not overlap the display panel, and the second support portion may be disposed below the third portion and not overlap the display panel.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIGS. 2A and 2B are perspective views illustrating an embodiment of an electronic apparatus according to the inventive concept:

FIG. 9 is a perspective view illustrating an embodiment of a display apparatus according to the inventive concept;

FIG. 10A is a perspective view illustrating an embodiment of a display apparatus according to the inventive concept;

DETAILED DESCRIPTION

Figure 1A:
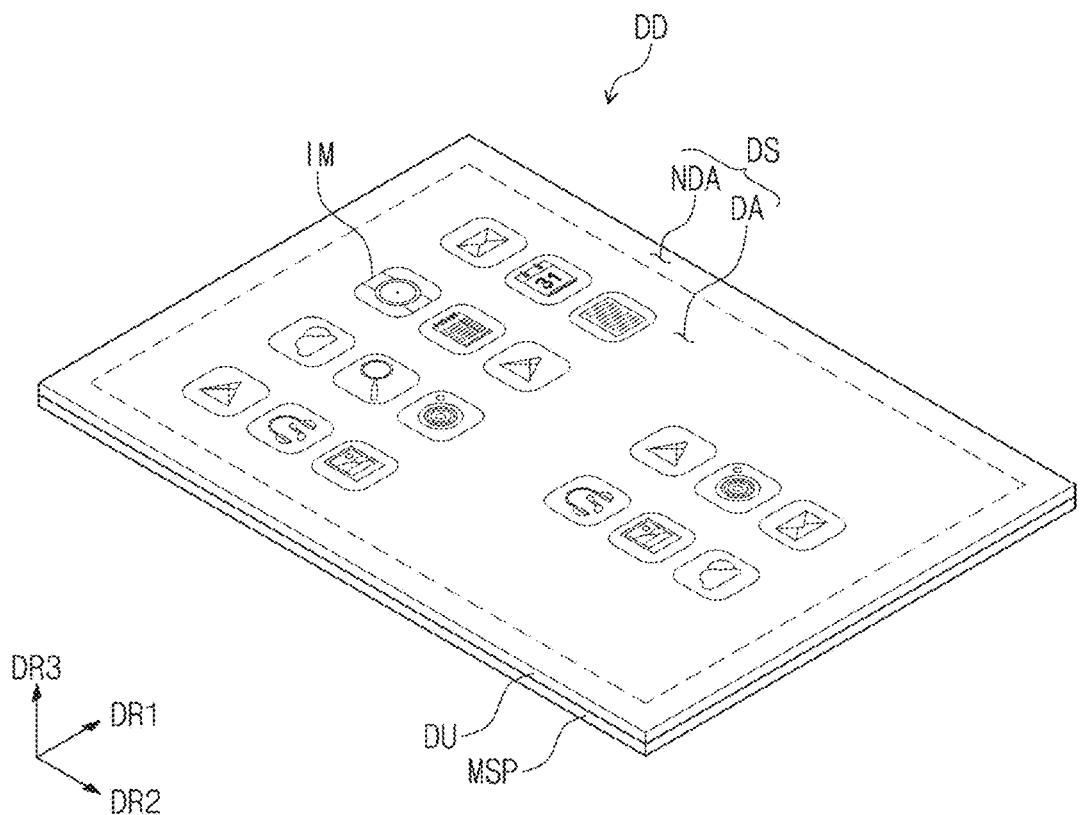
FIG. 1A is a perspective view illustrating an embodiment of a display apparatus according to the inventive concept.

In this specification, it will be understood that when one component (or region, layer, portion) is referred to as being 'on', 'connected to', or 'coupled to' another component, it can be directly disposed/connected/coupled on/to the one component, or an intervening third component may also be present.

Like reference numerals refer to like elements throughout. Also, in the drawing figures, the thickness, ratio, and dimensions of components are exaggerated for clarity of illustration. As used herein, the term and/or includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

Also, spatially relative terms, such as "below", "lower", "above", and "upper", may be used herein for ease of description to describe an element and/or a feature's relationship to another element(s) and/or feature(s) as illustrated in the drawings. The terms may be a relative concept and described based on directions expressed in the drawings.

The meaning of 'include' or 'comprise' specifies a property, a fixed number, a step, an operation, an element, a component or a combination thereof, but does not exclude other properties, fixed numbers, steps, operations, elements, components or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

Hereinafter, embodiments of the inventive concept will be described with reference to the accompanying drawings.

Figure 1B:
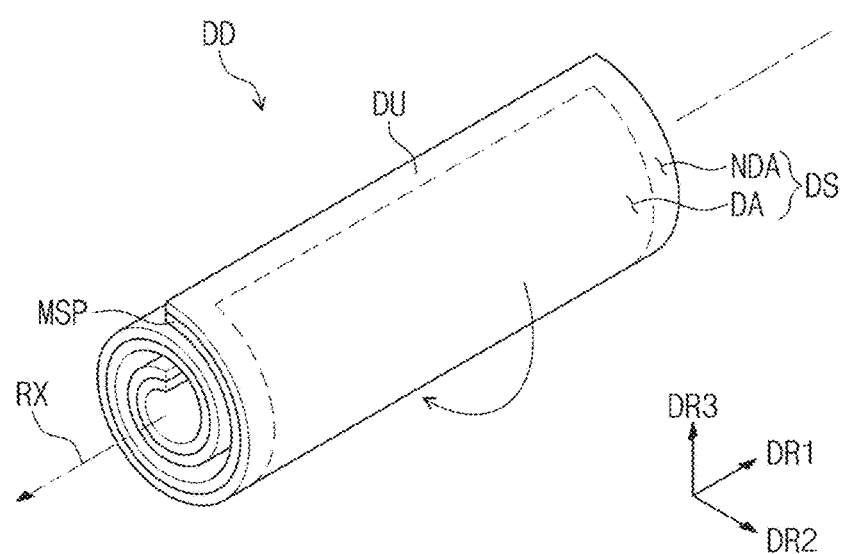
FIG. 1B is a perspective view illustrating an embodiment of a rolled state of the display apparatus in FIG. 1A.

FIG. 1A is a perspective view illustrating an embodiment of a display apparatus according to the inventive concept. FIG. 1B is a perspective view illustrating a rolled state of the display apparatus in FIG. 1A.

A display apparatus DD may be activated by an electrical signal and display an image. In an embodiment, the display apparatus DD may include a large-sized apparatus such as a television and an outdoor advertisement board and a small and medium-sized apparatus such as a monitor, a mobile phone, a tablet computer, a navigation unit, and a game console, for example. However, the inventive concept is not limited to the embodiments of the display apparatus DD.

The display apparatus DD in an embodiment may be flexible. The term "flexible" may represent a bendable property and include all structures from a completely folded structure to a structure bent by several nanometers. In an embodiment, the flexible display apparatus DD may include a rollable display apparatus that is rolled around a virtual axis, for example. FIG. 1A illustrates the display apparatus DD that is in an unrolled state, and FIG. 1B illustrates the display apparatus DD that is in a rolled state.

Referring to FIG. 1A, the display apparatus DD in the unrolled state may have a quadrangular (e.g., rectangular) shape having short sides extending in a first direction DR1 and long sides extending in a second direction DR2 crossing the first direction DR1. However, the inventive concept is not limited thereto. In an embodiment, the display apparatus DD may have various shapes such as a circular shape or a polygonal shape, for example.

The display apparatus DD may include a display unit DU and a support member MSP. The display unit DU may generate an image IM in correspondence to an electrical signal and provide the image IM to a user through a display surface DS. The display unit DU in the unrolled state may display the image IM toward a third direction DR3 on the display surface DS in parallel to each of the first direction DR1 and the second direction DR2. The display surface DS on which the image IM is displayed may correspond to a front surface of the display apparatus DD.

The image IM provided from the display unit DU may include a static image as well as a dynamic image. FIG. 1A illustrates a plurality of icons in an embodiment of the image IM.

Here, a front surface (or a top surface) and a rear surface (or a bottom surface) of each of members of the display apparatus DD may be opposed to each other in the third direction DR3, and a normal direction of each of the front surface and the rear surface may be substantially parallel to the third direction DR3. A spaced distance between the front surface and the rear surface defined along the third direction DR3 may correspond to a thickness of a member (or a unit).

In this specification, an expression "in a plan view" may be defined as a state when viewed in the third direction DR3. In this specification, an expression "in a cross-section" may be defined as a state when viewed in the first direction DR1 or the second direction DR2. Here, directions indicated by the first to third directions DR1, DR2 and DR3, as relative concepts, may be converted with respect to each other.

The display surface DS of the display unit DU may include a display area DA and a peripheral area NDA. The display area DA may be an area on which the image IM is displayed, and the peripheral area NDA may be an area on which the image IM is not displayed. The peripheral area NDA may have a predetermined color. The peripheral area NDA may have a light transmittance lower than that of the display area DA.

The peripheral area NDA may be adjacent to the display area DA. In an embodiment, the peripheral area NDA may surround the display area DA and define an edge of the display unit DU, for example. However, the inventive concept is not limited thereto. In an embodiment, the peripheral area NDA may be disposed adjacent to only one side or omitted, for example. In an alternative embodiment, the peripheral area NDA may be disposed on a side surface of the display apparatus DD instead of the front surface of the display apparatus DD.

The support member MSP may be disposed below the display unit DU to support the display unit DU. The support member MSP may be attached to a rear surface of the display unit DU. In an embodiment, the support member MSP may be attached to the rear surface of the display unit DU through a separate adhesive layer, for example.

The support member MSP may provide a flat surface to the display unit DU and prevent a surface quality of the display unit DU from being degraded. The support member MSP may have a predetermined impact resistance and prevent the display unit DU from being damaged by an external impact. The support member MSP may be bent by a predetermined curvature and support the rolled display unit DU to prevent deformation of the display unit DU. A description on a configuration of the support member MSP will be described later in detail.

Referring to FIG. 1B, the display apparatus DD may be rolled around a virtual rolling axis RX (hereinafter, also referred to as a rolling axis RX) extending in one direction. In an embodiment, the display apparatus DD may be rolled around the rolling axis RX extending in the first direction DR1, for example. Although the rolling axis RX extending in the first direction DR1 parallel to the short sides of the display apparatus DD is illustrated as an example in FIG. 1B, the inventive concept is not limited thereto. In an embodiment, the display apparatus DD may be rolled around the rolling axis RX parallel to the long sides of the display apparatus DD, for example.

The display unit DU may be rolled so that the display surface DS faces outside. The support member MSP may be disposed below the display unit DU to support the display unit DU and rolled together with the display unit DU. As the display apparatus DD is rolled, the display apparatus DD may be easily carried. Thus, even a large area display apparatus may be rolled and accommodated in an accommodation member.

Figure 2B:
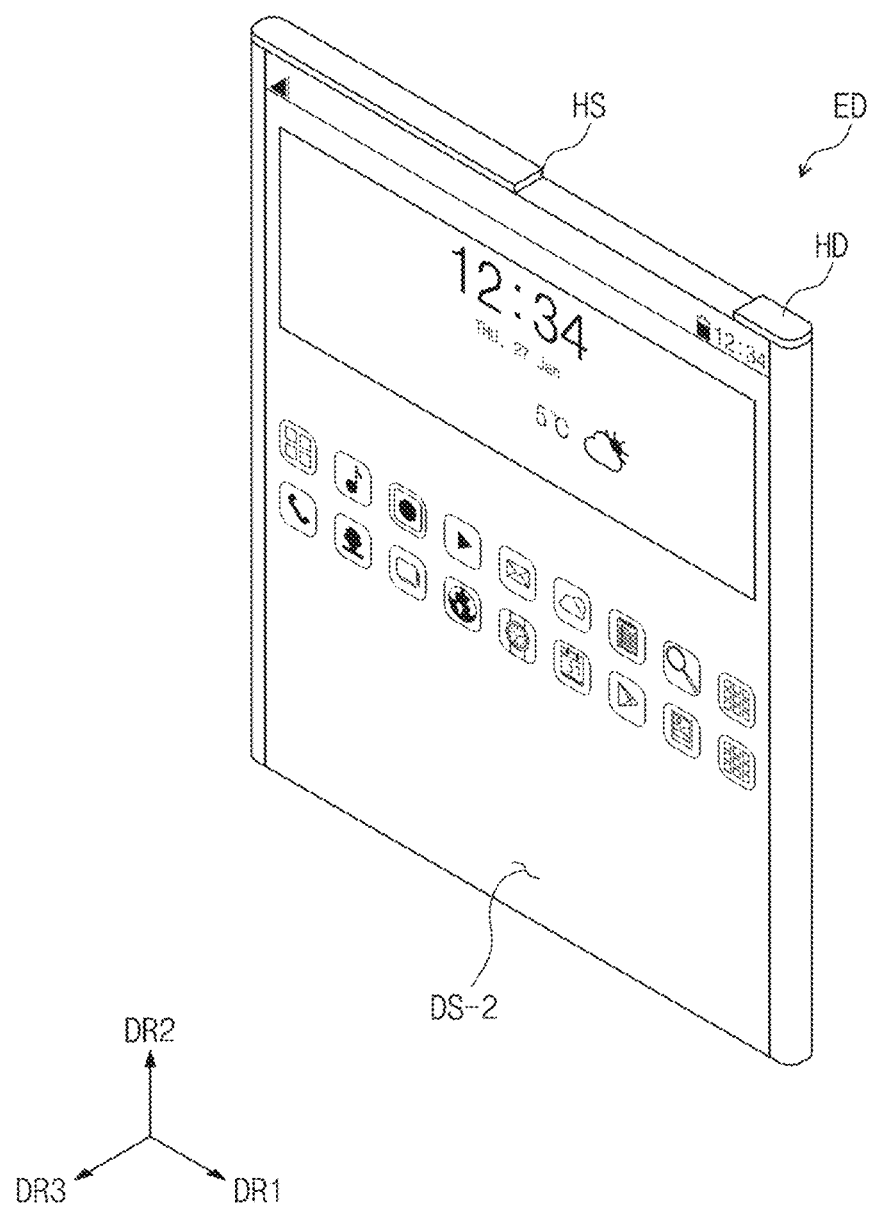
Figure 3:
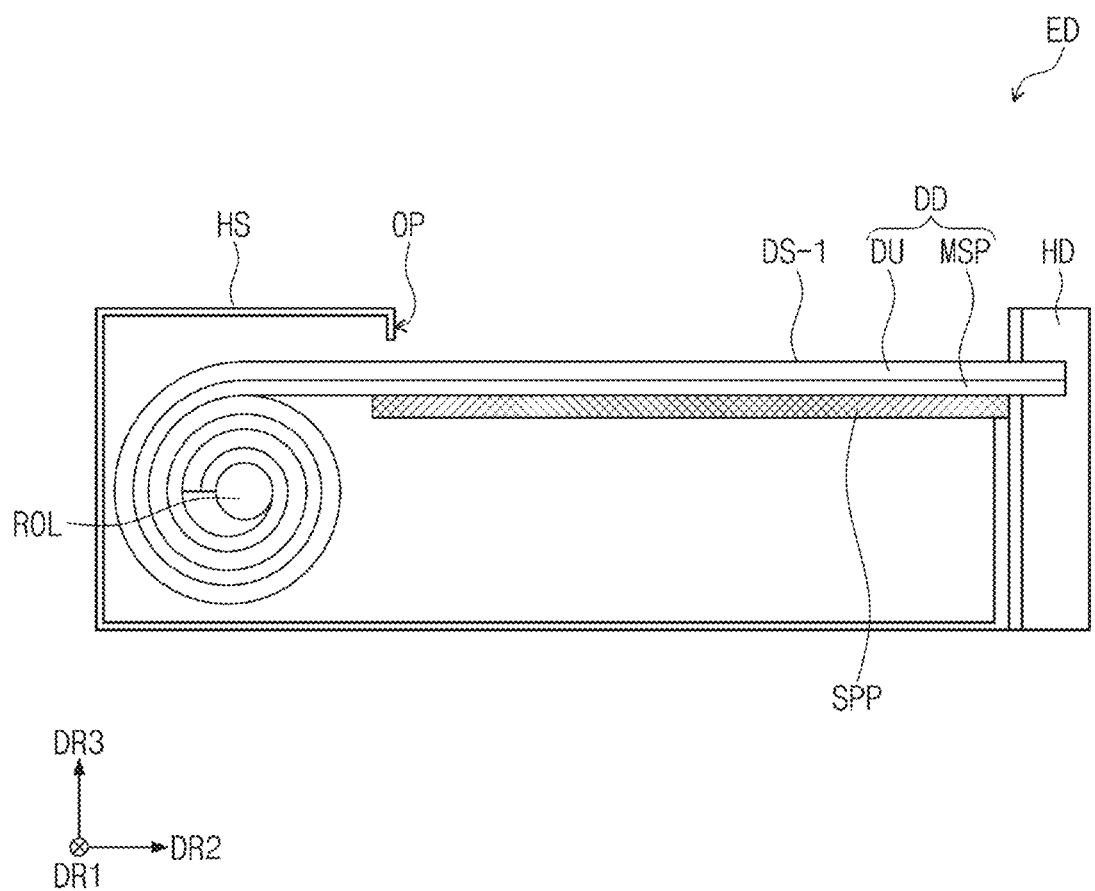
FIG. 3 is a cross-sectional view illustrating an embodiment of the electronic apparatus according to the inventive concept.

FIGS. 2A and 2B are perspective views illustrating an embodiment of an electronic apparatus according to the inventive concept. FIG. 3 is a cross-sectional view illustrating an embodiment of the electronic apparatus according to the inventive concept.

Referring to FIGS. 2A to 3, an electronic apparatus ED in an embodiment of the inventive concept may include a housing HS, a roller ROL, a display apparatus DD, a support plate SPP, and a holder HD. The roller ROL, the display apparatus DD, and the support plate SPP may be accommodated in the housing HS. The electronic apparatus ED may further include additional components.

The housing HS may have a bottom surface and a top surface that are parallel to each of the first direction DR1 and the second direction DR2 and side surfaces that connect the bottom surface and the top surface and define an accommodation space therein. An opening OP may be defined in the top surface of the housing HS.

The roller ROL may be disposed adjacent to one surface of the housing HS, which is spaced apart from the other surface, which is adjacent to the holder HD, of the housing HS in the second direction DR2, in the housing HS. The roller ROL may have a cylindrical shape extending in the first direction DR1 and have a circular shape when viewed in the first direction DR1. The roller ROL may have an extension direction corresponding to that of the rolling axis RX (refer to FIG. 1B). The roller ROL may rotate in clockwise and counterclockwise directions. Although not shown, the electronic apparatus ED may further include a driving unit for allowing the roller ROL to rotate.

The display apparatus DD may have one end connected to the roller ROL. The display apparatus DD may be wound around the roller ROL and accommodated in the housing HS. The display apparatus DD may be rolled by the roller ROL. As the roller ROL rotates in one direction, the display apparatus DD may be rolled around the roller ROL.

The display apparatus DD may have the other end connected to the holder HD. When the holder HD moves away from the housing HS in the second direction DR2, the roller ROL may rotate in a direction opposite to the one direction, and at least a portion of the display apparatus DD may be unrolled to the outside of the housing HS.

FIGS. 2A and 3 illustrate the electronic apparatus ED in the rolled state, in which the display apparatus DD is accommodated in the housing HS. Although the electronic apparatus ED that provides a display surface DS-1 as a portion of the display apparatus DD in the rolled state is exposed from the opening OP of the housing HS in an embodiment, the inventive concept is not limited thereto. In the rolled state, the display apparatus DD may be completely inserted to the housing HS.

FIG. 2B illustrates the electronic apparatus ED in which at least a portion of the display apparatus DD is unrolled. The display apparatus DD exposed from the housing HS in the unrolled state may provide an extended display surface DS-2

The display apparatus DD may include a display unit DU and a support member MSP disposed below the display unit DU. A description on the display unit DU and the support member MSP may be the same as the above description thereof.

The support plate SPP may be disposed on a rear surface of the display apparatus DD and support at least a portion of the display apparatus DD in the rolled state and the unrolled state. The support plate SPP may provide a flat surface to at least a portion of the display apparatus DD. The support plate SPP may be a component fixed in the housing HS or a component extended as an inner component is inserted and withdrawn while the display apparatus DD is unrolled.

The holder HD may be exposed to the outside of the housing HS in the rolled state and the unrolled state. The user may pull the holder HD in the second direction DR2 to unroll the display apparatus DD from the housing HS. The electronic apparatus ED may further include a driving module that unrolls or rolls the holder HD.

Figure 4A:
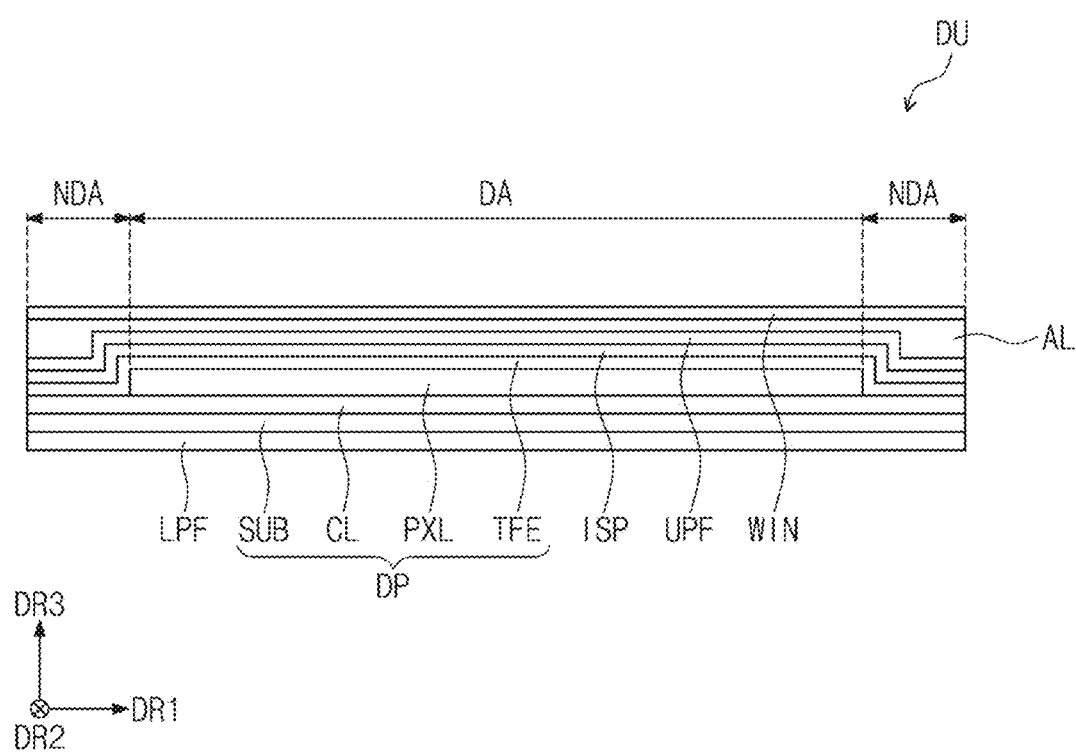
FIG. 4A is a cross-sectional view illustrating an embodiment of a display unit according to the inventive concept.
Figure 4B:
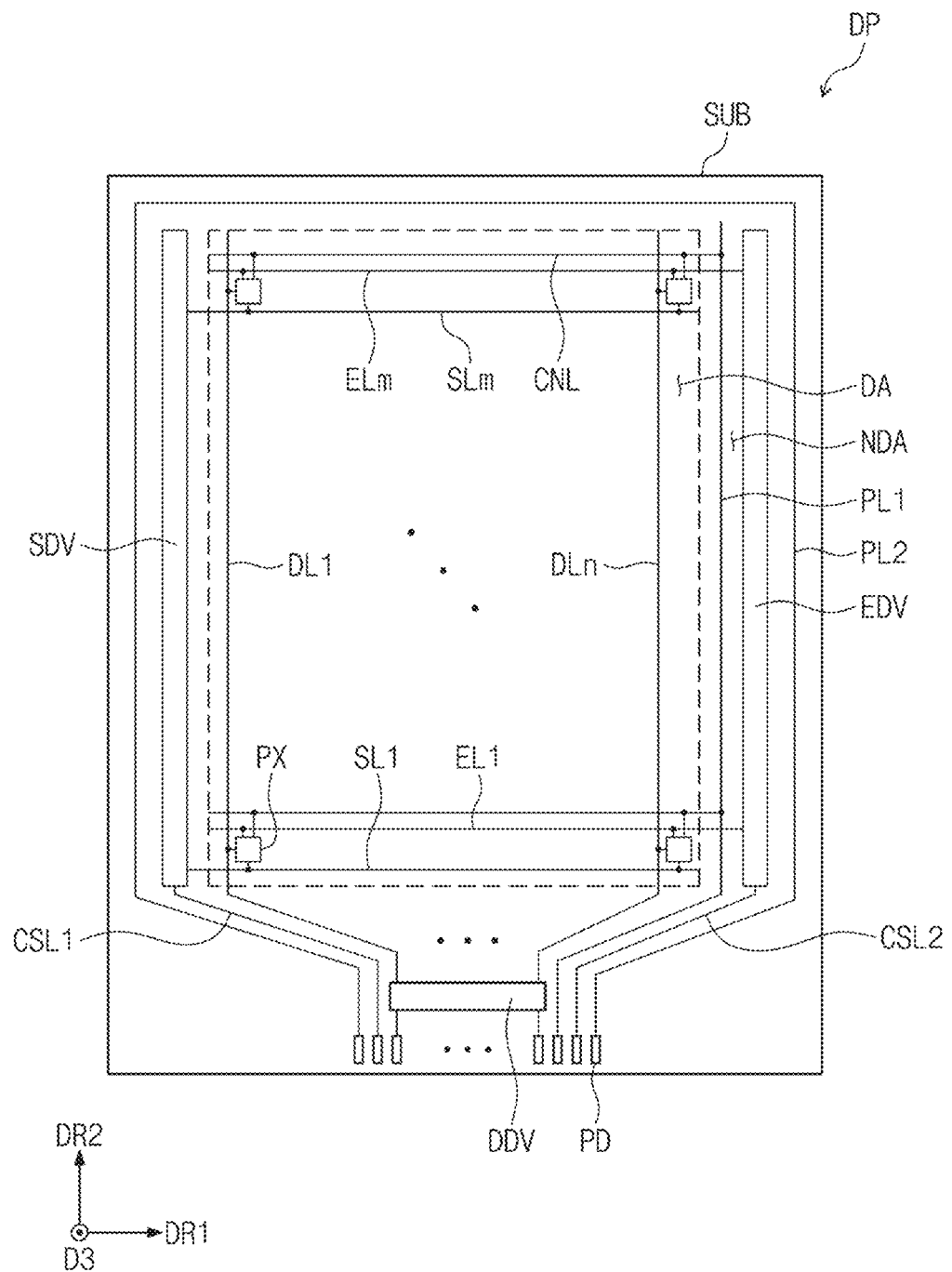
FIG. 4B is a plan view illustrating an embodiment of a display panel according to the inventive concept.

FIG. 4A is a cross-sectional view illustrating an embodiment of the display unit according to the inventive concept. FIG. 4B is a plan view illustrating an embodiment of the display panel according to the inventive concept.

Referring to FIG. 4A, the display unit DU in an embodiment of the inventive concept may include a display panel DP, an input sensing layer ISP, an upper protection layer UPF, a lower protection layer LPF, an adhesive layer AL, and a window WIN.

The display panel DP may have a flexible display panel. Although the display panel DP in an embodiment of the inventive concept may be a light-emitting display panel, the inventive concept is not particularly limited thereto. In an embodiment, the display panel DP may be an organic light-emitting display panel or an inorganic light-emitting display panel, for example. The organic light-emitting display panel may include a light-emitting layer including an organic light-emitting material. The inorganic light-emitting display panel may include a light-emitting layer including an inorganic light-emitting material such as a quantum dot or a quantum rod.

The display panel DP may include a base substrate SUB, a circuit layer CL, a display element layer PXL, and an encapsulation layer TFE. The base substrate SUB, the circuit layer CL, the display element layer PXL, and the encapsulation layer TFE may be sequentially laminated in the third direction DR3.

The base substrate SUB may include a display area DA and a peripheral area NDA that correspond to the display area DA and the peripheral area NDA of the display unit DU. The base substrate SUB may provide a base surface on which the circuit layer CL is disposed.

The base substrate SUB may include a flexible plastic material. In an embodiment, the base substrate SUB may include at least one synthetic resin layer, for example. The synthetic resin layer of the base substrate SUB may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, a perylene-based resin and a polyimide-based resin. However, the inventive concept is not limited to the material of the base substrate SUB.

The circuit layer CL may be disposed on the base substrate SUB. The circuit layer CL may include at least one insulation layer, driving elements, signal lines, and signal pads. The circuit layer CL may include a conductive pattern and a semiconductor pattern that provide the driving elements, the signal lines, and the signal pads. The driving elements, the signal lines, and the signal pads may be provided by providing an insulation layer, a semiconductor layer, and a conductive layer on the base substrate SUB through a method such as coating and deposition and then selectively patterning the insulation layer, the semiconductor layer, and the conductive layer through a method such as photolithography.

The display element layer PXL may be disposed on the circuit layer CL. The display element layer PXL may include light-emitting elements overlapping the display area DA.

The light-emitting elements of the display element layer PXL may be electrically connected to the driving elements of the circuit layer CL and provide light through the display area DA according to a signal of the driving element.

The encapsulation layer TFE may be disposed on the display element layer PXL to seal the light-emitting elements. The encapsulation layer TFE may include a plurality of thin-films. The thin-films of the encapsulation layer TFE may be disposed to improve an optical efficiency of the light-emitting element or protect the light-emitting element. In an embodiment, the encapsulation layer TFE may include at least one inorganic layer and at least one organic layer. The inorganic layer of the encapsulation layer TFE may protect the light-emitting element from moisture or oxygen. The organic layer of the encapsulation layer TFE may protect the light-emitting element from foreign substances such as dust particles.

The input sensing layer ISP may be disposed on the display panel DP. The input sensing layer ISP may be directly disposed on the display panel DP without using a separate adhesive member. That is, the display panel DP may be provided, and then the input sensing layer ISP may be provided on the base surface provided by the display panel through a continuous process. In an embodiment, the input sensing layer ISP may be directly disposed on the encapsulation layer TFE, for example. However, the inventive concept is not limited thereto. In an embodiment, the input sensing layer ISP may be manufactured into a panel shape through a separate manufacturing process distinguished from a manufacturing process of the display panel DP and then attached onto the display panel DP by an adhesive member, for example.

The input sensing layer ISP may sense an external input applied from the outside of the display apparatus DD (refer to FIG. 1A) and obtain coordinate information of the external input. The input sensing layer ISP may be driven by various methods such as a capacitive method, a resistive method, an infrared method or a pressure method. However, the inventive concept is not limited thereto.

However, in another embodiment of the inventive concept, the input sensing layer ISP may be omitted.

The upper protection layer UPF may be disposed on the input sensing layer ISP. The upper protection layer UPF may be coupled onto a front surface of the input sensing layer ISP by an adhesive member. However, the inventive concept is not limited thereto. In an embodiment, the upper protection layer UPF may be directly provided onto the front surface of the input sensing layer ISP, for example.

The lower protection layer LPF may be disposed below the display panel DP. The lower protection layer LPF may be coupled onto a rear surface of the display panel DP by an adhesive member. However, the inventive concept is not limited thereto. In an embodiment, the lower protection layer LPF may be directly provided onto the rear surface of the display panel DP, for example.

Each of the upper protection layer UPF and the lower protection layer LPF may include at least one of a protection film layer and an impact absorbing layer for protecting the display panel DP and the input sensing layer ISP from an external impact.

Each of the upper protection layer UPF and the lower protection layer LPF may include a flexible polymer material such as polyethylene terephthalate and polyimide. The impact absorbing layer may include a material such as a sponge, a foam, or a urethane resin and absorb an impact applied to the display panel DP and the input sensing layer ISP. However, the inventive concept is not limited to the shape of each of the upper protection layer UPF and the lower protection layer LPF as long as the upper protection layer UPF and the lower protection layer LPF are capable of protecting the display panel DP and the input sensing layer ISP.

The adhesive layer AL may be disposed on the upper protection layer UPF. The adhesive layer AL may be disposed between the upper protection layer UPF and the window WIN and couple the upper protection layer UPF to the window WIN. The adhesive layer AL may include a transparent adhesive such as an optically clear adhesive film ("OCA"), an optically clear resin ("OCR"), or a pressure sensitive adhesive film ("PSA"). However, the inventive concept is not limited to the kind of the adhesive included in the adhesive layer AL.

The window WIN may be disposed on the upper protection layer UPF. The window WIN may cover the entire outside of the display panel DP, the input sensing layer ISP, and the upper protection layer UPF and protect components of the display unit DU from external impacts and scratches.

The window WIN may have an optically clear insulating material. In an embodiment, the window WIN may include glass, sapphire, or polymer, for example. The window WIN may have a single-layer structure or a multilayer structure. The window WIN may further include functional layers such as an anti-fingerprint layer, a phase control layer, and a hard coating layer that are disposed on an optically clear substrate.

Referring to FIG. 4B, the display panel DP may include a base substrate SUB, a plurality of pixels PX, a plurality of signal lines SL1 to SLm, DL1 to DLn, EL1 to ELm, CSL1, CSL2, PL1, PL2, and CNL, a scan driver SDV, a data driver DDV, and an emission driver EDV. Here, n and m are natural numbers.

The base substrate SUB may include a display area DA and a peripheral area NDA as described above. The base substrate SUB may provide a base surface on which lines and electrical elements of the display panel DP are disposed. Although the base substrate SUB has a quadrangular (e.g., rectangular) shape parallel to each of the first direction DR1 and the second direction DR2 in a plan view as an example in FIG. 4B, the inventive concept is not limited thereto.

Each of the pixels PX may include a pixel driving circuit including a light-emitting element, a plurality of transistors (e.g., a switching transistor and a driving transistor) connected to the light-emitting element, and at least one capacitor. Each of the pixels PX may emit light in correspondence to an electrical signal applied to the pixel PX.

The pixels PX may be disposed on the display area DA. However, this is merely illustrative. In an embodiment, some of the pixels PX may include a thin-film transistor disposed on the peripheral area NDA, for example. However, the inventive concept is not limited thereto.

Each of the scan driver SDV, the data driver DDV, and the emission driver EDV may be disposed on the peripheral area NDA. However, the inventive concept is not limited thereto. In an embodiment, at least one of the scan driver SDV, the data driver DDV, and the emission driver EDV may overlap the display area DA, and as the peripheral area NDA is reduced in area, a bezel area of the display apparatus DD (refer to FIG. 1A) may be reduced.

The data driver DDV may be provided in the form of an integrated circuit chip defined as a driving chip and disposed (e.g., mounted) to the peripheral area NDA of the display panel DP. However, the inventive concept is not limited thereto. The data driver DDV may be disposed (e.g., mounted) to a separate flexible circuit board connected to the display panel DP and electrically connected to the display panel DP.

The plurality of signal lines SL1 to SLm, DL1 to DLn, EL1 to ELm, CSL1, CSL2, PL1, PL2, and CNL may include a plurality of scan lines SL1 to SLm, a plurality of data lines DL1 to DLn, a plurality of emission lines EL1 to Elm, first and second control lines CSL1 and CSL2, first and second power lines PL1 and PL2, and connection lines CNL. Here, m and n are natural numbers.

The scan lines SL1 to SLm may each extend in the first direction DR1 and be connected to the scan driver SDV. The data lines DL1 to DLn may each extend in the second direction DR2 and be connected to the data driver DDV. The emission lines EL1 to Elm may each extend in the first direction DR1 and be connected to the emission driver EDV.

The first power line PL1 may extend in the second direction DR2 and be disposed on the peripheral area NDA. The first power line PL1 may be disposed between the display area DA and the emission driver EDV. However, the inventive concept is not limited thereto. The first power line PL1 may be disposed between the display area DA and the scan driver SDV.

The connection lines CNL may each extend in the first direction DR1. The connection lines CNL may be arranged in the second direction DR2 and connected to the first power line PL1 and the pixels LX. The connection lines CNL may be disposed in a layer different from that of the first power line PL1 and electrically connected to the first power line PL1. However, the inventive concept is not limited thereto. In an embodiment, the connection lines CNL may be integrated with the first power line PL1 in the same layer, for example. A first voltage may be applied to the pixels PX through the first power line PL1 and the connection lines CNL, which are connected to each other.

The second power line PL2 may be disposed on the peripheral area NDA. The second power line PL2 may be disposed at an outer portion further than the scan driver SDV and the emission driver EDV. Although not shown, the second power line PL2 may extend toward the display area DA and be connected to the pixels PX. A second voltage having a level lower than the first voltage may be applied to the pixels PX through the second power line PL2. The first voltage and the second voltage may be applied to each of electrodes of the light-emitting element of the pixel PX, and thus the light-emitting element may generate and emit light.

The first control line CSL1 may be connected to the scan driver SDV. The second control line CSL2 may be connected to the emission driver EDV.

The pads PD may be disposed adjacent to a lower end of the peripheral area NDA. The pads PD may be disposed closer to a lower end of the display panel DP than the data driver DDV. The pads PD may be arranged in the first direction DR1. The display apparatus DD (refer to FIG. 1A) may include a timing controller for controlling operations of the scan driver SDV, the data driver DDV, and the emission driver EDV and a circuit board including a voltage generation part for generating a voltage, and the pads PD may be a portion to which the circuit board of the display apparatus DD (refer to FIG. 1A) is connected.

The pads PD may be connected to the respective corresponding signal line of the plurality of signal lines. The first and second power lines PL1 and PL2 and the first and second control lines CSL1 and CSL2 may be connected to the pads PD. The data lines DL1 to DLn may be connected to the corresponding pads PD through the data driver DDV. In an embodiment, the data lines DL1 to DLn may be connected to the data driver DDV, and the data driver DDV may be connected to the pads PD that respectively correspond to the data lines DL1 to DLn, respectively, for example.

The scan driver SDV may generate scan signals in response to the scan control signal. The scan signals may be applied to the pixels PX through the scan lines SL1 to SLm. The data driver DDV may generate data voltages corresponding to image signals in response to the data control signal. The data voltages may be applied to the pixels PX through the data lines DL1 to DLn. The emission driver EDV may generate emission signals in response to the emission control signal. The emission signals may be applied to the pixels PX through the emission lines EL1 to ELm.

The pixels PX may receive the data voltages in response to the scan signals. The pixels PX may display an image by emitting light having luminance corresponding to the data voltages in response to the emission signals. The pixels PX may have an emission time that is controlled by the emission signals. The display panel DP may output the image through the display area DA by the pixels PX.

Figure 5A:
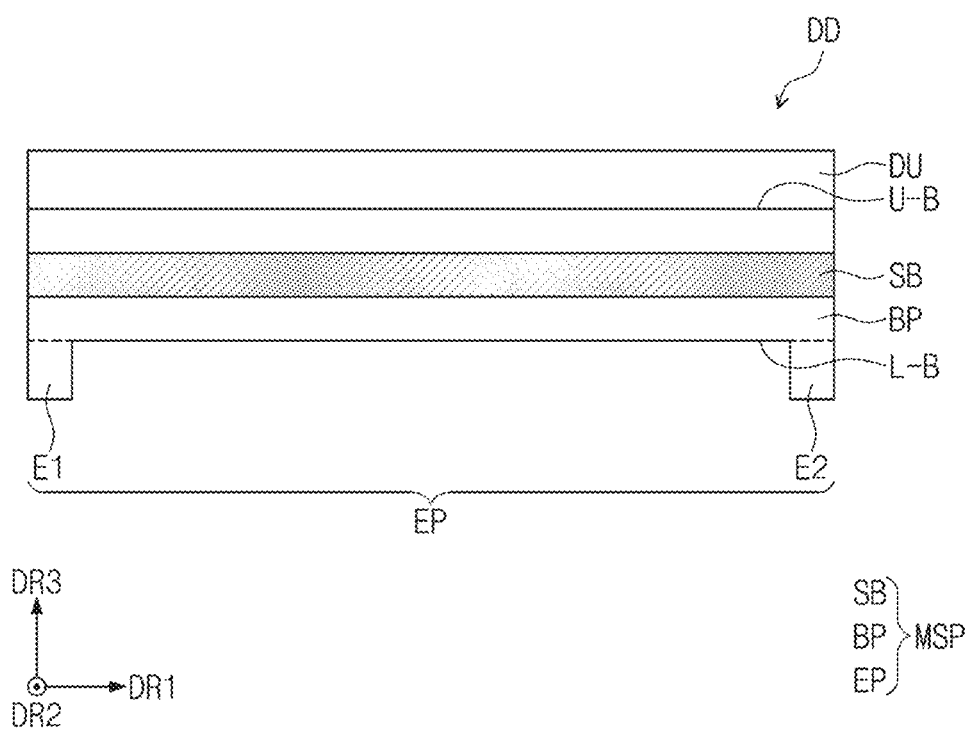
FIGS. 5A and 5B are cross-sectional views illustrating an embodiment of the display apparatus according to the inventive concept.
Figure 5B:
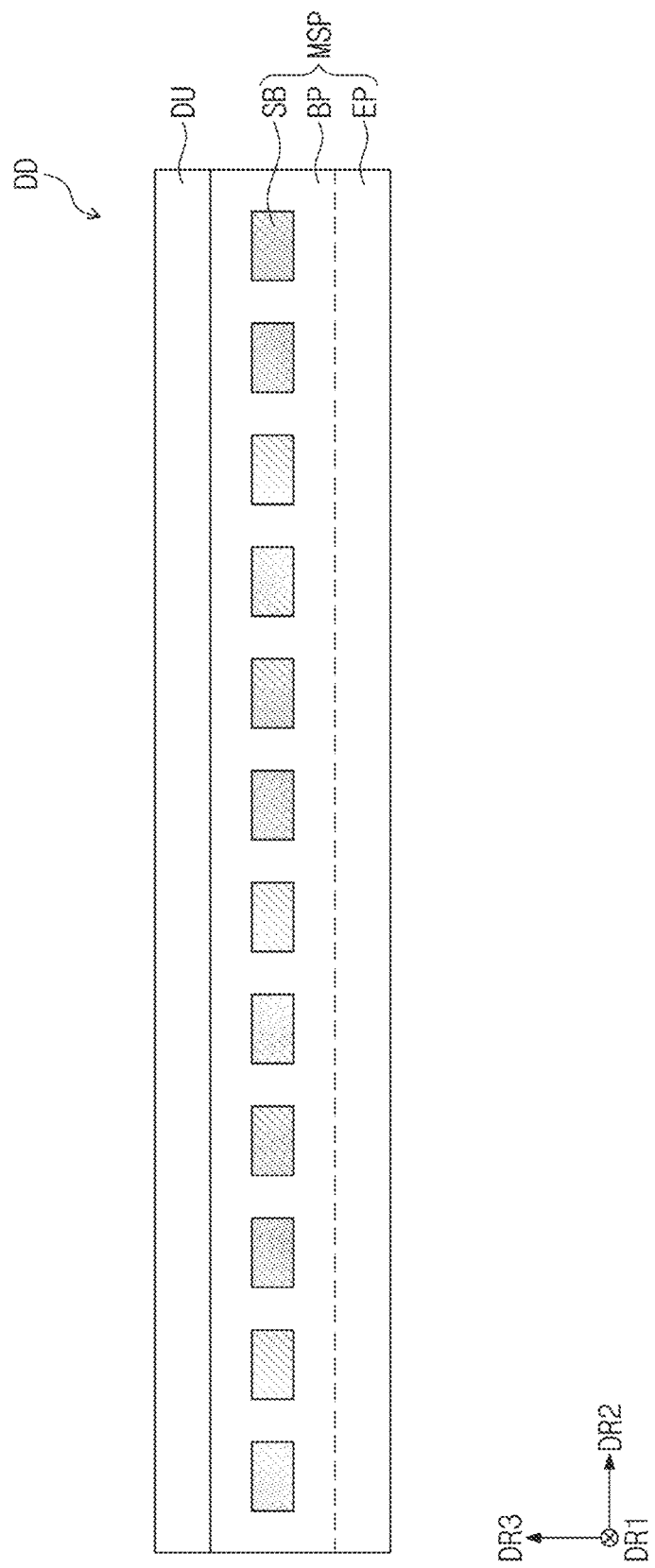
Figure 5C:
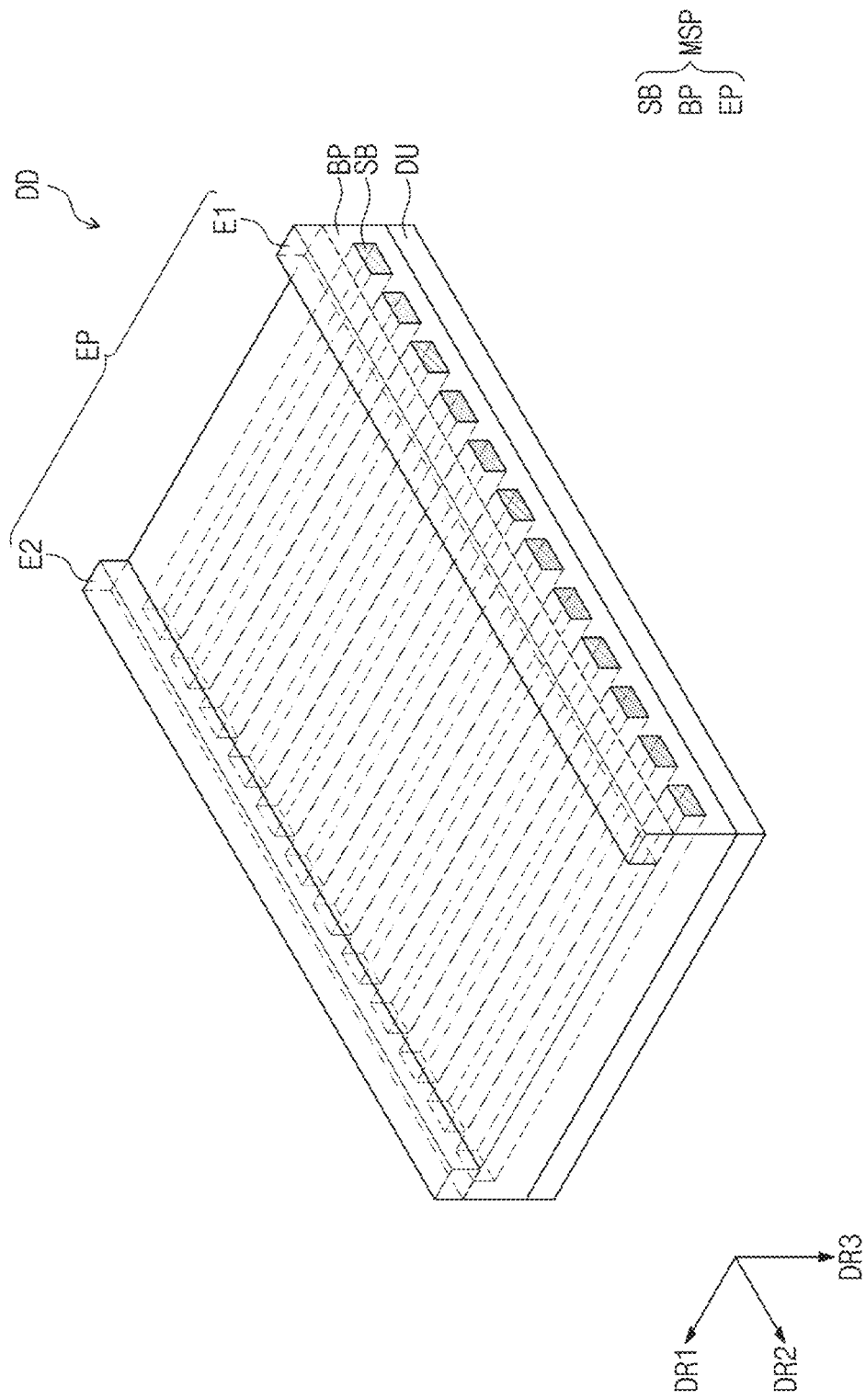
FIG. 5C is a perspective view illustrating an embodiment of the display apparatus according to the inventive concept.

FIGS. 5A and 5B are cross-sectional views illustrating an embodiment of the display apparatus according to the inventive concept. FIG. 5C is a perspective view illustrating another embodiment of the display apparatus according to the inventive concept. FIG. 5A is a cross-sectional view taken along a direction in which the short side of the display apparatus DD extends, and FIG. 5B is a cross-sectional view taken along a direction in which the long side of the display apparatus DD extends. FIG. 5C is a perspective view when viewed from a lower portion of the display apparatus DD for convenience of description. In FIG. 5C, the display unit DU is disposed below the support member MSP. Hereinafter, however, a laminated relationship between components will be described with reference to the cross-sectional views of FIGS. 5A and 5B.

Referring to FIGS. 5A to 5C, the display apparatus DD in an embodiment of the inventive concept may include the display unit DU and the support member MSP. Since the display unit DU is described above with reference to FIGS. 4A and 4B, a description thereof will be omitted.

The support member MSP may include support bars SB, a base part BP, and a protruding part EP.

Each of the support bars SB may extend in the first direction DR1 parallel to the rolling axis RX (refer to FIG. 1B). The support bars SB may be arranged in the second direction DR2 crossing an extension direction of the support bars SB. The support bars SB may be spaced by an equal distance from each other in the second direction DR2. However, the inventive concept is not limited the distance between the support bars SB. In an embodiment, the distance between the support bars SB may gradually increase or decrease in the second direction DR2, for example.

The support bars SB may each have a bar shape extending in the first direction DR1. In an embodiment, as illustrated in FIGS. 5B and 5C, each of the support bars SB may have a quadrangular (e.g., rectangular) shape in a cross-section viewed in the first direction DR1. However, the inventive concept is not limited to the cross-section of each of the support bars SB. In an embodiment, each of the support bars SB may have a polygonal shape or a circular shape, for example.

Each of the support bars SB may have a predetermined rigidity. In an embodiment, each the support bars SB may include at least one of metal, plastic, carbon fiber, and glass fiber, for example. Each of the support bars SB may include aluminum, stainless steel, invar, carbon fiber reinforced plastic ("CFRP"), or glass fiber reinforced plastic ("GFRP"). Also, in an embodiment, each of the support bars SB may include metal attached to a magnet.

Each of the support bars SB may have a modulus greater than that of each of the base part BP and the protruding part EP. Each of the support bars SB having a relatively great modulus may support the display unit DU and improve an impact resistance of the support member MSP.

The base part BP may be coupled to the support bars SB. The base part BP may cover at least a portion of each of the support bars SB. According to the embodiment, the base part BP may cover all of surfaces extending in the first direction DR1 in the support bars SB. The base part BP may be filled between the support bars SB spaced apart from each other in the second direction DR2. Thus, the support bars SB in the embodiment may be filled in the base part BP.

In an embodiment, the base part BP may expose opposite ends of each of the support bars SB. However, the inventive concept is not limited thereto. In an embodiment, the base part BP may cover all of the opposite ends of each of the support bars SB, for example. In this case, the base part BP may cover the entire surfaces of each of the support bars SB.

According to the embodiment, the base part BP may have an edge aligned with that of the display unit DU. That is, the base part BP may have a width in the first direction DR1 and a width in the second direction DR2, which are substantially the same as those of the display unit DU.

The base part BP may include a top surface U-B parallel to the first direction DR1 and the second direction DR2 and a bottom surface L-B opposed to the top surface U-B. A distance between the top surface U-B and the bottom surface L-B of the base part BP may be substantially uniform. Thus, the base part BP may have a uniform thickness in an area in which the display unit DU is disposed.

Since the display unit DU is disposed on the top surface U-B of the base part BP having a flat surface, a portion of the display unit DU overlapping a space between the support bars SB may maintain a flat state instead of being deformed. That is, a surface quality of the display unit DU may be improved by the base part BP.

The protruding part EP may be disposed below the base part BP. According to the embodiment, the protruding part EP may include a first support portion E1 and a second support portion E2. Each of the first support portion E1 and the second support portion E2 may extend in the second direction DR2. The first support portion E1 and the second support portion E2 may be spaced apart from each other in the first direction DR1. Each of the first support portion E1 and the second support portion E2 may protrude from the bottom surface L-B of the base part BP in a direction away from the display unit DU.

The first support portion E1 may overlap at least a portion of one ends of the support bars SB. In the embodiment, the first support portion E1 may overlap the display unit DU. The first support portion E1 may be aligned to the edge of the base part BP at which the one ends of the support bars SB are exposed.

The second support portion E2 may overlap at least a portion of the one ends of the support bars SB and the other ends spaced apart therefrom in the first direction DR1. In the embodiment, the second support portion E2 may overlap the display unit DU. The second support portion E2 may be aligned to the edge of the base part BP at which the other ends of the support bars SB are exposed.

Each of the base part BP and the protruding part EP may include an elastomer having a predetermined elastic force. In an embodiment, the elastomer may include at least one of thermoplastic polyurethane, silicone, thermoplastic rubbers, elastolefin, thermoplastic olefin, polydimethylsiloxane, polyurethane acrylate, polyamide, polyether block amide, synthetic polyisoprene, poly butadiene, chloroprene rubber, butyl rubber, styrene-butadiene, epichlorohydrin rubber, polyacrylic rubber, silicone rubber, fluorosilicone rubber, fluoroelastomers, and ethylene-vinyl acetate, for example.

According to the embodiment, the base part BP and the protruding part EP may include the same material. The base part BP and the protruding part EP may have an integrated shape through the same process. However, the inventive concept is not limited thereto. In an embodiment, the base part BP and the protruding part EP may include different materials, for example. The base part BP and the protruding part EP may be provided by different processes. In an embodiment, the support member MSP may be provided through a process of attaching the protruding part EP to the base part BP after a process of manufacturing the base part BP, for example.

Figure 5D:
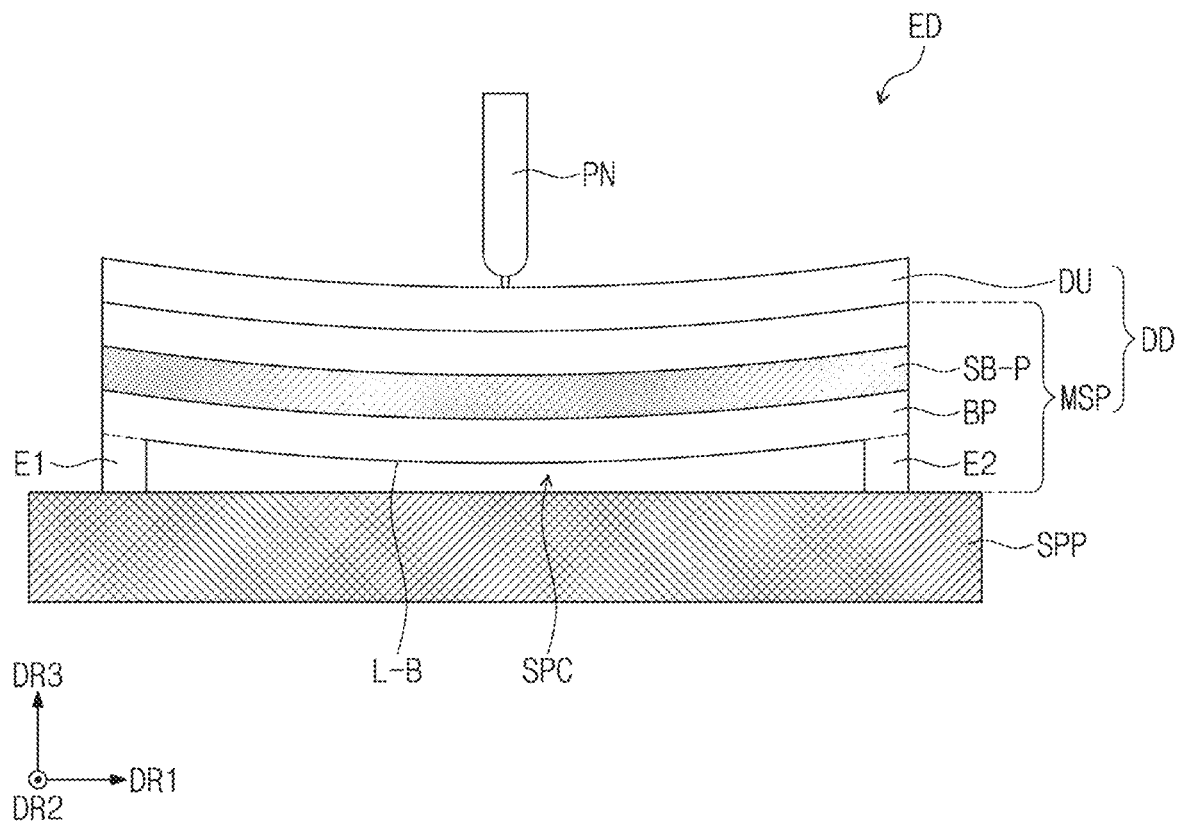
FIG. 5D is a cross-sectional view illustrating an embodiment of the electronic apparatus on which a pen drop test is performed according to the inventive concept.

FIG. 5D is a cross-sectional view illustrating an embodiment of the electronic apparatus ED according to the inventive concept. FIG. 5D illustrates a cross-section of the electronic apparatus ED at a moment when an external impact is applied onto the display apparatus DD. The external impact is applied by pen drop as an example. The same or similar components as those described in FIGS. 1A to 5C will be designated by the same or similar reference numerals, respectively, and overlapped descriptions thereof will be omitted.

Referring to FIG. 5D, the electronic apparatus ED in an embodiment may include a display apparatus DD and a support plate SPP disposed below the display apparatus DD. The display apparatus DD may correspond to the display apparatus DD described with reference to FIGS. 5A to 5C. The support plate SPP may correspond to the support plate SPP described in FIG. 3. As illustrated in FIG. 5D, each of the first support portion E1 and the second support portion E2 may contact the support plate SPP and be disposed on the support plate SPP.

According to the embodiment, a spaced space SPC may be defined between the support plate SPP and the bottom surface L-B of the base part BP by the first support portion E1 and the second support portion E2. The spaced space SPC between the support plate SPP and the bottom surface L-B of the base part BP may be an empty space.

When the external impact is applied to a local portion of the display apparatus DD, at least one support bar SB-P corresponding to the local portion may be pressed downward. Here, the corresponding support bar SB-P may be bent in a direction close to the support plate SPP, and a curvature may be provided to the corresponding support bar SB-P.

The base part BP and the display unit DU may be also bent in the direction close to the support plate SPP together with the corresponding support bar SB-P, and a curvature of each of the base part BP and the display unit DU may correspond to that of the support bar SB-P. That is, as the spaced space SPC defined by the protruding part EP provides a space in which at least one support bar SB-P, the base part BP, and the display unit DU are bent, an impact amount applied to the local portion by the external impact may be transmitted to a further extended portion.

Thus, the support member MSP in an embodiment of the inventive concept may reduce the impact amount applied by the external impact to improve the impact resistance of the display apparatus DD. Thus, the rollable display apparatus DD that is relatively vulnerable to an external impact may be prevented from being damaged.

In this specification, a display apparatus according to a comparative example includes a support member that does not include the protruding part EP unlike the support member MSP included in the display apparatus DD according to the inventive concept. That is, the support member of the display apparatus according to the comparative example may include support bars and a base part, and an entire bottom surface of the base part may contact the support plate SPP. Thus, in case of the display apparatus according to the comparative example, a spaced space does not exist between the bottoms surface of the base part and the support plate SPP.

When an external impact is applied to a local portion of the display apparatus according to the comparative example, a space in which at least one support bar corresponding to the local portion is pressed downward does not exist. Thus, an impact amount applied to the display apparatus according to the comparative example may not be transmitted to an extended portion from the local portion. When the same external impact is applied, the impact amount transmitted to a display panel according to the comparative example may be greater than that transmitted to the display panel DP according to the inventive concept. Thus, the display apparatus according to the comparative example may have an impact resistance less than that of the display apparatus DD according to the inventive concept.

Although the first support portion E1 and the second support portion E2 contact the support plates SPP and are disposed on the support plates SPP as an example in FIG. 5D, the inventive concept is not limited thereto. In another embodiment of the inventive concept, a separate support plate SPP disposed below a display apparatus DD may not be provided. In this case, a first support portion E1 and a second support portion E2 may contact a ground surface on which the display apparatus DD is disposed, and a spaced space SPC may be defined between the ground surface and a bottom surface L-B of a base part BP.

Figure 6A:
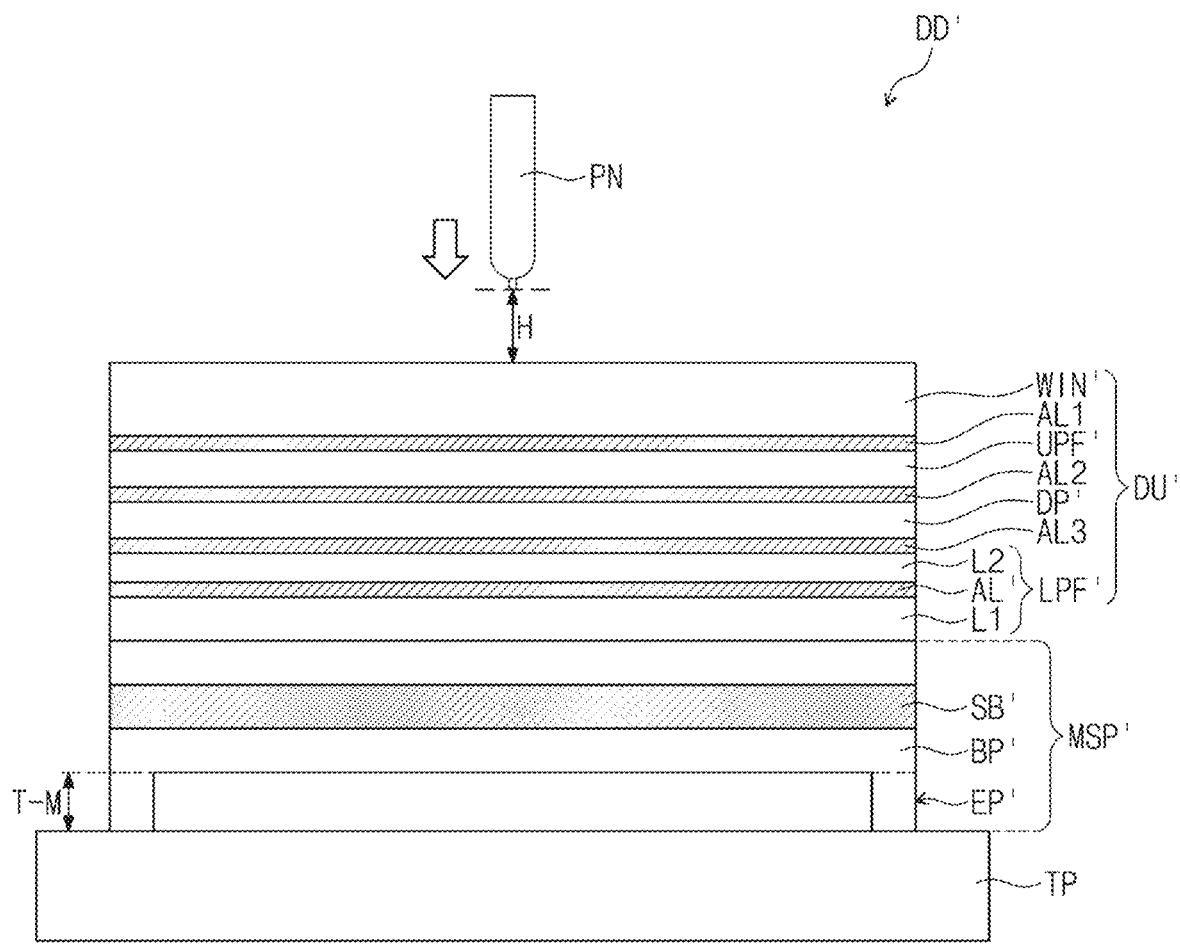
FIG. 6A is a cross-sectional view illustrating an embodiment of the display apparatus on which a pen drop test is performed according to the inventive concept.
Figure 6B:
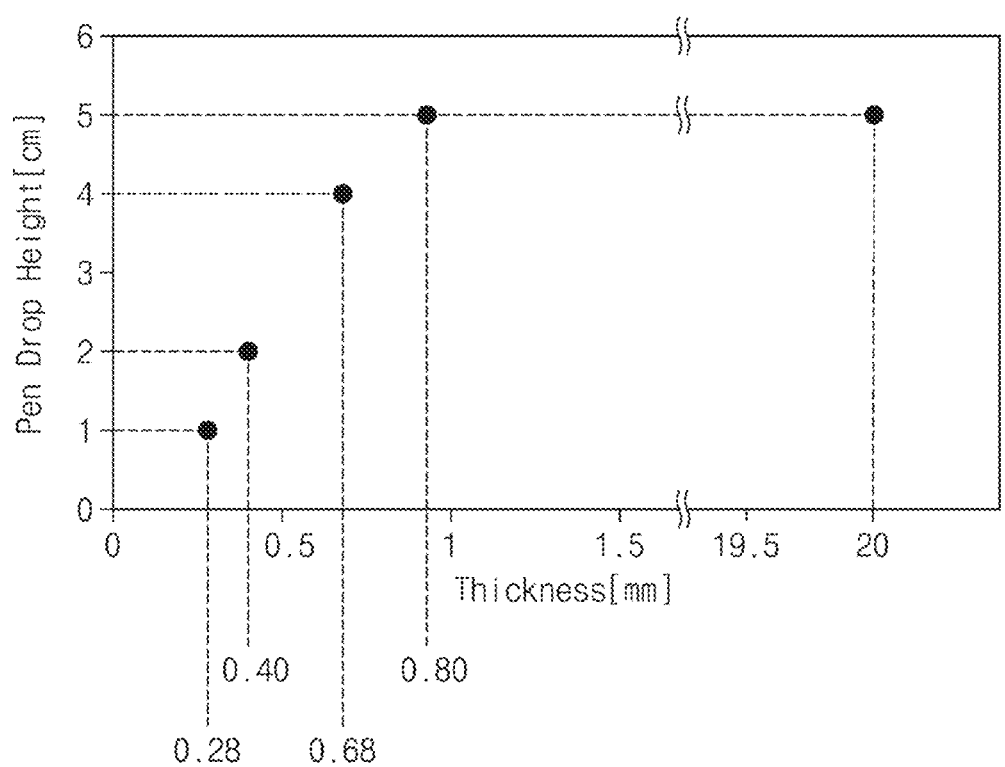
FIG. 6B is a graph representing an embodiment of a relationship between a thickness of a protruding part and a pen drop height according to the inventive concept.

FIG. 6A is a cross-sectional view illustrating an embodiment of a state a pen drop test is performed on a display apparatus DD according to the inventive concept. FIG. 6B is a graph representing an embodiment of a relationship between a thickness of the protruding part EP and a pen drop height according to the inventive concept. FIG. 6A illustrates a cross-section illustrating an embodiment of a process of performing the pen drop test by the display apparatus DD manufactured for a test.

Referring to FIG. 6A, a display apparatus DD' manufactured for a test includes a display unit DU' and a support member MSP' disposed below the display unit DU'.

The display unit DU' includes a window WIN', an upper protection layer UPF' disposed below the window WIN', a display panel DP' disposed below the upper protection layer UPF', and a lower protection layer LPF' disposed below the display panel DP'. The window WIN', the upper protection layer UPF', the display panel DP', and the lower protection layer LPF' are coupled through adhesive layers AL1, AL2, and AL3.

The window WIN' includes polyether block amide ("PEBA") and has a thickness of about 50 micrometers ($\mu m$) or more to about 150 $\mu m$ or less. The upper protection layer UPF' includes polyethylene terephthalate ("PET") and has a thickness of about 20 $\mu m$ or more to about 70 $\mu m$ or less.

The lower protection layer LPF' includes a first protection layer L1, a second protection layer L2 disposed below the first protection layer L1, and an additional adhesive layer AL' disposed between the first protection layer L1 and the second protection layer L2.

The first protection layer L1 includes polyimide having a black color and has a thickness of about 5 $\mu m$ or more to about 70 $\mu m$ or less. The second protection layer L2 includes thermoplastic polyurethane ("TPU") and has a thickness of about 50 $\mu m$ or more to about 150 $\mu m$ or less. The additional adhesive layer AL' includes pressure sensitive adhesive ("PSA") and has a thickness of about 5 $\mu m$ or more to about 50 $\mu m$ or less.

Each of the adhesive layers AL1, AL2, and AL3 respectively disposed between the window WIN', the upper protection layer UPF', the display panel DP', and the lower protection layer LPF' includes pressure sensitive adhesive ("PSA") and has a thickness of about 5 $\mu m$ or more to about 50 $\mu m$ or less.

The support member MSP' includes support bars SB', a base part BP', and a protruding part EP'. The support member MSP' on which the pen drop test is performed correspond to the support member MSP descried with reference to FIGS. 5A to 5D. Each of the support bars SB' includes carbon fiber reinforced plastic ("CFRP") and has a thickness of about 0.5 millimeter (mm) or more to about 1.5 mm or less. Each of the base part BP' and the protruding part EP' includes silicone, and the base part BP' has a thickness of about 500 $\mu m$ or more to about 2000 $\mu m$ or less.

As illustrated in FIG. 6A, the impact resistance of the display apparatus DD' is evaluated such that the display apparatus DD' manufactured for the test is placed on a test substrate TP, and then a pen PN is dropped onto the display apparatus DD'. The test substrate TP may provide an environment similar to the ground surface on which the display apparatus DD' is disposed or the support plate SPP which are described in FIGS. 3 and 5D.

In the pen drop test in an embodiment of the inventive concept, a minimum thickness T-M of the protruding part EP' at which a dark spot is not generated in the display panel DP' is measured by setting a thickness of the protruding part EP' as a variable and dropping the pen PN from a preset height (hereinafter, a pen drop height H). The pen drop height H may be set as a minimum spaced distance from a top surface of the display unit DU' (a top surface of the window WIN') to a pen tip.

Referring to FIG. 6B, when the pen drop height H is set to about 1 centimeter (cm), the minimum thickness T-M of the protruding part EP' at which a dark spot is not generated in the display panel DP' is about 0.28 mm. When the pen drop height H is set to about 2 cm, the minimum thickness T-M of the protruding part EP' at which a dark spot is not generated in the display panel DP' is about 0.40 mm. When the pen drop height H is set to about 4 cm, the minimum thickness T-M of the protruding part EP' at which a dark spot is not generated in the display panel DP' is about 0.68 mm. When the pen drop height H is set to about 5 cm, the minimum thickness T-M of the protruding part EP' at which a dark spot is not generated in the display panel DP' is about 0.80 mm.

That is, as the thickness of the protruding part EP' increases, the pen drop height H at which a dark spot is generated may increase. Thus, as the thickness of the protruding part EP' increases, the impact resistance against the pen drop may be improved.

As the thickness of the protruding part EP' increases, a spaced distance between the base part BP' and the test substrate TP may increase, and a bending possibility of each of the base part BP' and the support bars SB' may increase.

Thus, although the impact force applied to the display apparatus DD' increases, the bending possibility of each of the base part BP' and the support bars SB' may sufficiently reduce the impact force.

However, when the protruding part EP' has a small thickness, since a spaced distance between the base part BP' and the test substrate TP is not sufficient, the bending possibility of each of the base part BP' and the support bars SB' may be low. Thus, when the impact force applied to the display apparatus DD' increases, the base part BP' may not be sufficiently bent to contact the support plate SPP (or ground surface).

However, an improvement effect of the impact resistance according to thickness increase of the protruding part EP' may not exceed a predetermined level. According to this test, although the thickness of the protruding part EP' is equal to or greater than about 0.8 mm, the pen drop height H at which the dark spot is generated may constantly maintain a height of about 5 cm.

That is, when the external impact applied to the display apparatus DD' is equal to or greater than a predetermined level, as an impact deviated from a limit of an impact force sustainable by the support bars SB' is applied to the support bars SB', the support bars SB' may be damaged. Thus, although the thickness of the support bar SB' increases, the impact resistance of the support member MSP' may not be further improved. Thus, the protruding part EP' may improve the impact resistance of the display apparatus DD' within a range of the impact force sustainable by the support bars SB'.

In an embodiment, an "optimized thickness of the protruding part EP" may be a minimum thickness of the protruding part EP' at the maximum pen drop height H sustainable by the support bars SB'. In this case, reduction in rolling characteristic of the display apparatus DD' may be minimized by maximally improving the impact resistance of the protruding part EP' and minimizing the thickness of the support member, which increases by the protruding part EP'.

In an embodiment of the inventive concept, when a material and a thickness of each of components of the display unit DU' are differently set, or a material and a thickness of each of components of the support member MSP' are differently set, the optimized thickness of the protruding part EP' may be changed. Also, the optimized thickness of the protruding part EP' may be changed according to the type (e.g., a small and medium size or a large size) of the electronic apparatus ED (refer to FIG. 2A) to which the display apparatus DD' is applied. As described above, the optimized thickness of the protruding part EP' may be selected by performing the pen drop test to measure the thickness of the protruding part EP' at which a defect of the display panel DP' is not generated according to a preset pen drop height.

When the pen drop test is performed on the display apparatus according to the comparative example, a dark spot is generated on the display panel when the pen drop height H is greater than about 0 cm. Through this, the display apparatus according to the comparative example may be damaged by the external impact applied by the pen drop. That is, when the support member MSP' does not include the protruding part EP', the impact resistance against the impact applied to the local portion may be extremely low. Thus, in an embodiment of the inventive concept, as the support member MSP' includes the protruding part EP' to define the spaced space SPC (refer to FIG. 5D), the display apparatus DD' having the impact resistance improved more than the display apparatus according to the comparative example may be provided.

Figure 7:
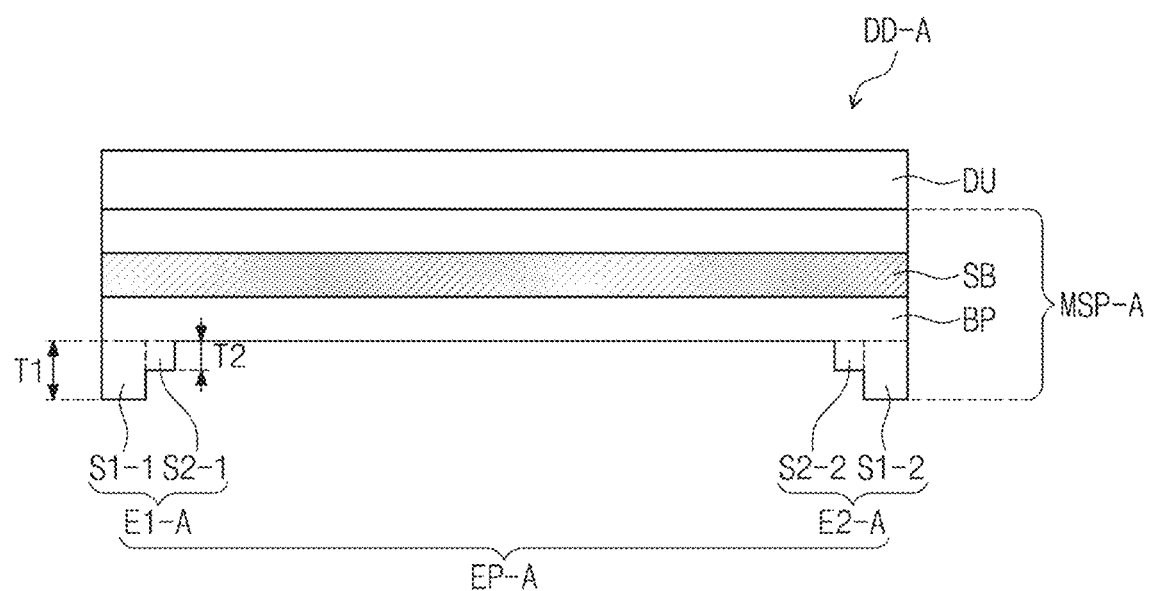
FIG. 7 is a cross-sectional view illustrating an embodiment of a display apparatus according to the inventive concept.

FIG. 7 is a cross-sectional view illustrating an embodiment of a display apparatus DD-A according to the inventive concept. The same or similar components as those described in FIGS. 1A to 6B will be designated by the same or similar reference numerals, respectively, and overlapped descriptions thereof will be omitted.

Referring to FIG. 7, the display apparatus DD-A in an embodiment of the inventive concept may include a display unit DU and a support member MSP-A. The support member MSP-A may include support bars SB, a base part BP, and a protruding part EP-A.

The protruding part EP-A may include a first support portion E1-A and a second support portion E2-A. According to the embodiment, the first support portion E1-A may include a first sub-portion S1-1 and a second sub-portion S2-1, and the second support portion E2-A may include a third sub-portion S1-2 and a fourth sub-portion S2-2.

The first sub-portion S1-1 of the first support portion E1-A may overlap one end of each of the support bars SB. The third sub-portion S1-2 of the second support portion E2-A may overlap the other end of each of the support bars SB. Each of the first sub-portion S1-1 and the third sub-portion S1-2 may have a first thickness T1.

The second sub-portion S2-1 of the first support portion E1-A may be disposed at an inner side more than the first sub-portion S1-1 of the first support portion E1-A. In an embodiment, the first sub-portion S1-1 and the second sub-portion S2-1 may have an integrated shape.

The fourth sub-portion S2-2 of the second support portion E2-A may be disposed at an inner side more than the third sub-portion S1-2 of the second support portion E2-A. In an embodiment, the third sub-portion S1-2 and the fourth sub-portion S2-2 may have an integrated shape.

Each of the second sub-portion S2-1 and the fourth sub-portion S2-2 may have a second thickness T2. The second thickness T2 may be less than the first thickness T1. Thus, the second sub-portion S2-1 and S2-2 of each of the first support portion E1-A and the second support portion E2-A may be spaced apart from the support plate SPP (or ground surface).

According to the embodiment, as a thickness of the protruding part EP-A disposed at the inner side is set to be small, bending of the base part BP and the support bars SB may not be interrupted, and a width of the protruding part EP-A in the first direction DR1 may increase. Thus, bending characteristics of the base part BP and the support bars SB may be improved, and support characteristics of the support member MSP-A to the display unit DU may be improved.

Although each of the first support portion E1-A and the second support portion E2-A has two sub-portions having different thicknesses as an example in FIG. 7, this is merely illustrative, and the inventive concept is not limited thereto. In an embodiment, each of the first support portion E1-A and the second support portion E2-A may include three or more sub-portions having different thicknesses, for example.

Also, although each of the first and second sub-portions S1-1 and S2-1 and the third and fourth sub-portions S1-2 and S2-2 has the integrated shape as an example in FIG. 7, the inventive concept is not limited thereto. In an embodiment, each of the first and second sub-portions S1-1 and S2-1 and the third and fourth sub-portions S1-2 and S2-2 may be spaced apart from each other, for example.

Figure 8:
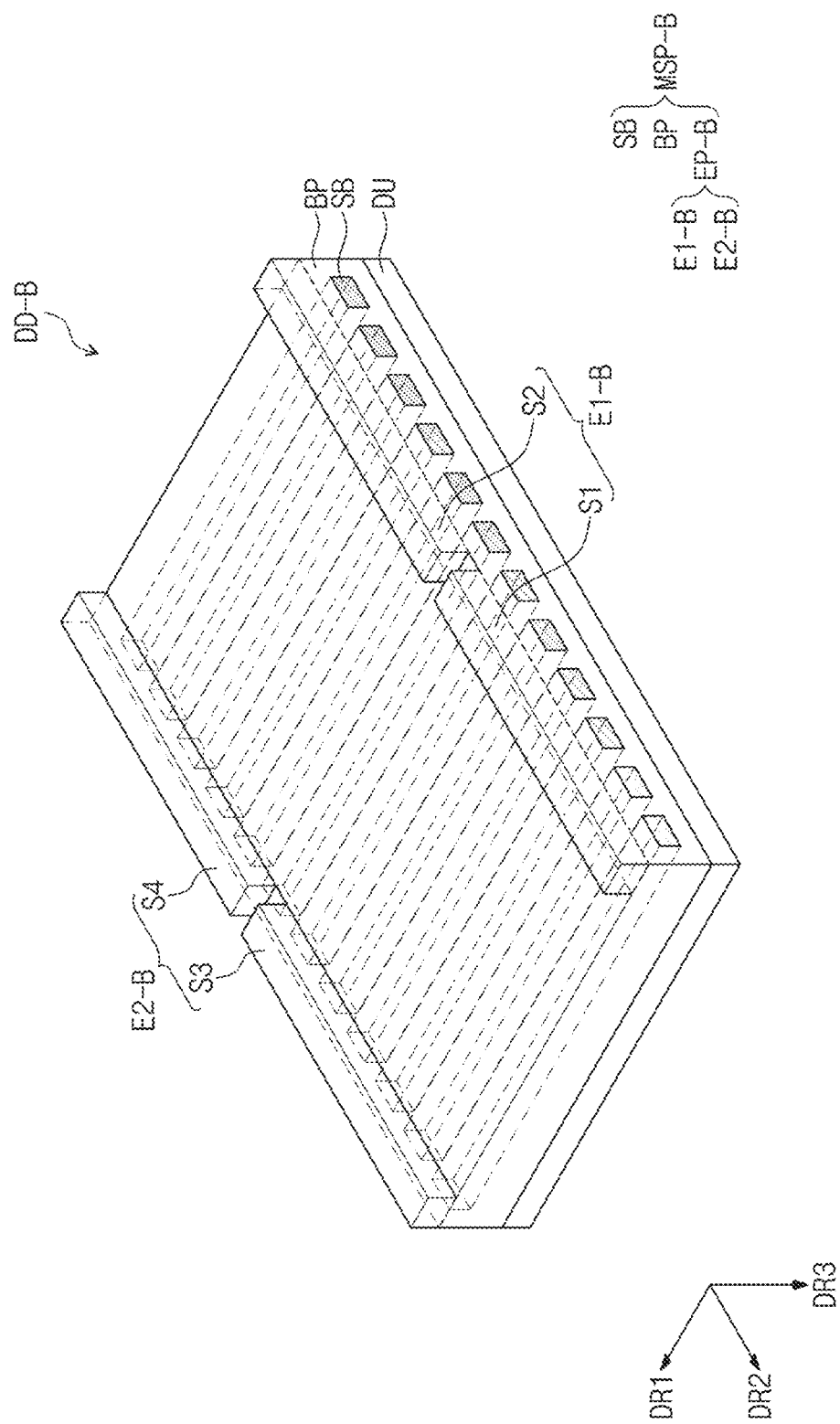
FIG. 8 is a perspective view illustrating an embodiment of a display apparatus according to the inventive concept.

FIG. 8 is a perspective view illustrating an embodiment of a display apparatus DD-B according to the inventive concept. FIG. 9 is an exploded perspective view illustrating an embodiment of a display apparatus DD-C according to the inventive concept. FIGS. 8 and 9 are perspective views when viewed from a lower portion of the display apparatus DD-B and DD-C for convenience of description. Although the display unit DU is disposed below the support member MSP-B and MSP-C in FIGS. 8 and 9, hereinafter, a laminated relationship between components will be described based on a state in which the support member MSP-B and MSP-C is disposed below the display unit DU. The same or similar components as those described in FIGS. 1A to 6B will be designated by the same or similar reference numerals, respectively, and overlapped descriptions thereof will be omitted.

Referring to FIG. 8, the display apparatus DD-B in an embodiment of the inventive concept may include a display unit DU and a support member MSP-B. The support member MSP-B may include support bars SB, a base part BP, and a protruding part EP-B.

According to the embodiment, the protruding part EP-B may include a plurality of first support portions E1-B and a plurality of second support portions E2-B. Each of the first support portions E1-B and the second support portions E2-B may be disposed below the base part BP and extend in the second direction DR2.

In an embodiment, the first support portions E1-B may include a first sub-portion S1 and a second sub-portion S2. Each of the first sub-portion S1 and the second sub-portion S2 may be disposed below the base part BP and extend in the second direction DR2. The first sub-portion S1 and the second sub-portion S2 may overlap at least a portion of one end of each of the support bars SB.

The first sub-portion S1 and the second sub-portion S2 may be spaced apart from each other in the second direction DR2. A spaced space between the first sub-portion S1 and the second sub-portion S2 may overlap an area between the support bars, which are adjacent to each other, among the support bars SB. However, the inventive concept is not limited thereto. In an embodiment, the spaced space between the first sub-portion S1 and the second sub-portion S2 may overlap any one support bar among the support bars SB, for example.

The second support portions E2-B may include a third sub-portion S3 and a fourth sub-portion S4. Each of the third sub-portion S3 and the fourth sub-portion S4 may be disposed below the base part BP and extend in the second direction DR2. The third sub-portion S3 and the fourth sub-portion S4 may overlap at least a portion of the other end of each of the support bars SB.

The third sub-portion S3 and the fourth sub-portion S4 may be spaced apart from each other in the second direction DR2. A spaced space between the third sub-portion S3 and the fourth sub-portion S4 may overlap an area between the support bars, which are adjacent to each other, among the support bars SB. However, the inventive concept is not limited thereto. In an embodiment, the spaced space between the third sub-portion S3 and the fourth sub-portion S4 may overlap any one support bar among the support bars SB, for example.

The third sub-portion S3 may face the first sub-portion S1 in the first direction DR1, and the fourth sub-portion S4 may face the second sub-portion S2 in the first direction DR1. However, the inventive concept is not limited to the arrangement relationship between the first sub-portion S1 and the third sub-portion S3 and between the second sub-portion S2 and the fourth sub-portion S4.

Although the first support portion E1-B includes two sub-portions, and the second support portion E2-B includes two sub-portions as an example in FIG. 8, the inventive concept is not limited thereto. In an embodiment, each of the first support portion E1-B and the second support portion E2-B may include three or more sub-portions, for example. In an embodiment, each of the first support portion E1-B and the second support portion E2-B may one-to-one overlap the support bars SB, for example.

Referring to FIG. 9, the display apparatus DD-C in an embodiment of the inventive concept may include a display unit DU and a support member MSP-C. The support member MSP-C may include support bars SB, a base part BP, and a protruding part EP-C.

According to the embodiment, the protruding part EP-C may include a first support portion E1, a second support portion E2, a third support portion E3, and a fourth support portion E4. Each of the first to fourth support portions E1, E2, E3, and E4 may protrude from a bottom surface L-B of the base part BP in a direction away from the display unit DU.

Each of the first support portion E1 and the second support portion E2 may extend in the second direction DR2. The first support portion E1 and the second support portion E2 may be spaced apart from each other in the first direction DR1. The first support portion E1 may overlap at least a portion of one ends of the support bars SB. The second support portion E2 may overlap at least a portion of the other ends, which are spaced apart from the one ends of the support bars SB in the first direction DR1.

Each of the third support portion E3 and the fourth support portion E4 may extend in the first direction DR1. The third support portion E3 and the fourth support portion E4 may be spaced apart from each other in the second direction DR2. Each of the third support portion E3 and the fourth support portions E4 may extend from the first support portion E1 to the second support portion E2 in the first direction DR1.

In an embodiment, the third support portion E3 may extend from one end portion of the first support portion E1 to one end portion of the second support portion E2 in the first direction DR1. The fourth support portion E4 may extend from the other end portion of the first support portion E1 to the other end portion of the second support portion E2 in the first direction DR1. In an embodiment, as the first to fourth support portions E1, E2, E3, and E4 are connected to each other, the protruding part EP-C may have a quadrangular (e.g., rectangular) ring shape.

According to the embodiment, as the protruding part EP-C supports the entire edge of the base part BP, support characteristics of the support member MSP-C to the display unit DU may be improved, and a deflection phenomenon of the display unit DU, the base part BP, and the support bars SB may be prevented.

Figure 10B:
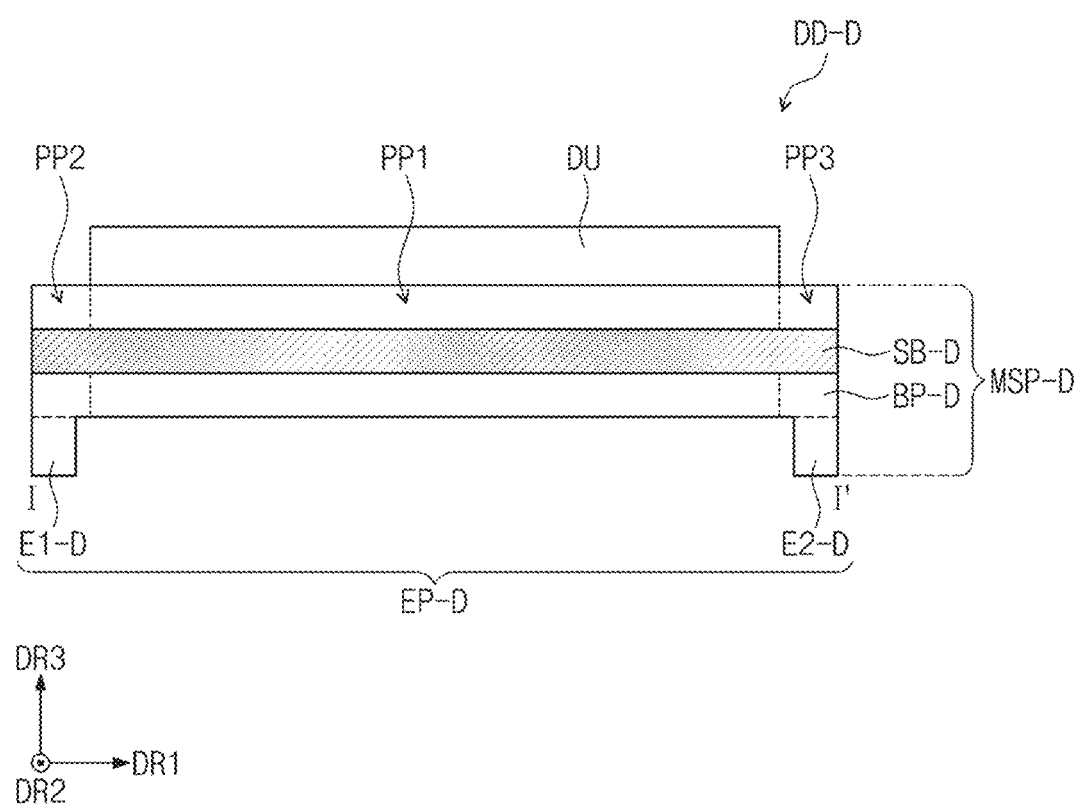
FIG. 10B is a cross-sectional view illustrating an embodiment of the display apparatus according to the inventive concept and taken along line I-I' of FIG. 10A.

FIG. 10A is a perspective view illustrating an embodiment of a display apparatus according to the inventive concept. FIG. 10B is a cross-sectional view illustrating an embodiment of the display apparatus according to the inventive concept and taken along line I-I' of FIG. 10A. FIG. 10B is a cross-sectional view illustrating an embodiment of a display apparatus according to the inventive concept and taken along line I-I' of FIG. 10A. The same or similar components as those described in FIGS. 1A to 9 will be designated by the same or similar reference numerals, respectively, and overlapped description thereof will be omitted.

Referring to FIGS. 10A and 10B, a display apparatus DD-D in an embodiment of the inventive concept may include a display unit DU and a support member MSP-D. The support member MSP-D may include support bars SB-B, a base part BP-D, and a protruding part EP-D.

The support bars SB-B in the embodiment may include a portion that is not in overlap with the display unit DU. Opposite ends of each of the support bars SB-D may not overlap the display unit DU. Each of the support bars SB-D may have a length in the first direction DR1 greater than that of the display unit DU in the first direction DR1.

The base part BP-D may include a first portion PP1, a second portion PP2, and a third portion PP3. The base part BP-D in the embodiment may include a portion that is not in overlap with the display unit DU.

The first portion PP1 may overlap the display unit DU. Each of the second portion PP2 and the third portion PP3 may not overlap the display unit DU. The second portion PP2 and the third portion PP3 may be spaced apart from each other with the first portion PP1 therebetween in the first direction DR1. The base part BP-D may have a length in the first direction DR1 greater than that of the display unit DU in the first direction DR1.

The protruding part EP-D may include a first support portion E1-D and a second support portion E2-D. The first support portion E1-D may be disposed below the second portion PP2. The second support portion E2-D may be disposed below the third portion PP3. The protruding part EP-D in the embodiment may not overlap the display unit DU.

According to the embodiment, as the protruding part EP-D does not overlap the display unit DU, the protruding part EP-D may overlap the second portion PP2 or the third portion PP3 of the base part BP-D when the display apparatus DD-D is rolled. That is, a bottom surface of the protruding part EP-D may contact a top surface of the base part BP-D. The protruding part EP-D may not overlap the display unit DU when the display apparatus DD-D is rolled, and a thickness of the display apparatus DD-D may not increase in the rolled state. Thus, reduction in rolling characteristics of the display apparatus DD-D may be prevented. Also, a phenomenon in which the display unit DU is pressed by the protruding part EP-D may be prevented, and the display unit DU may be prevented from being damaged.

Figure 10C:
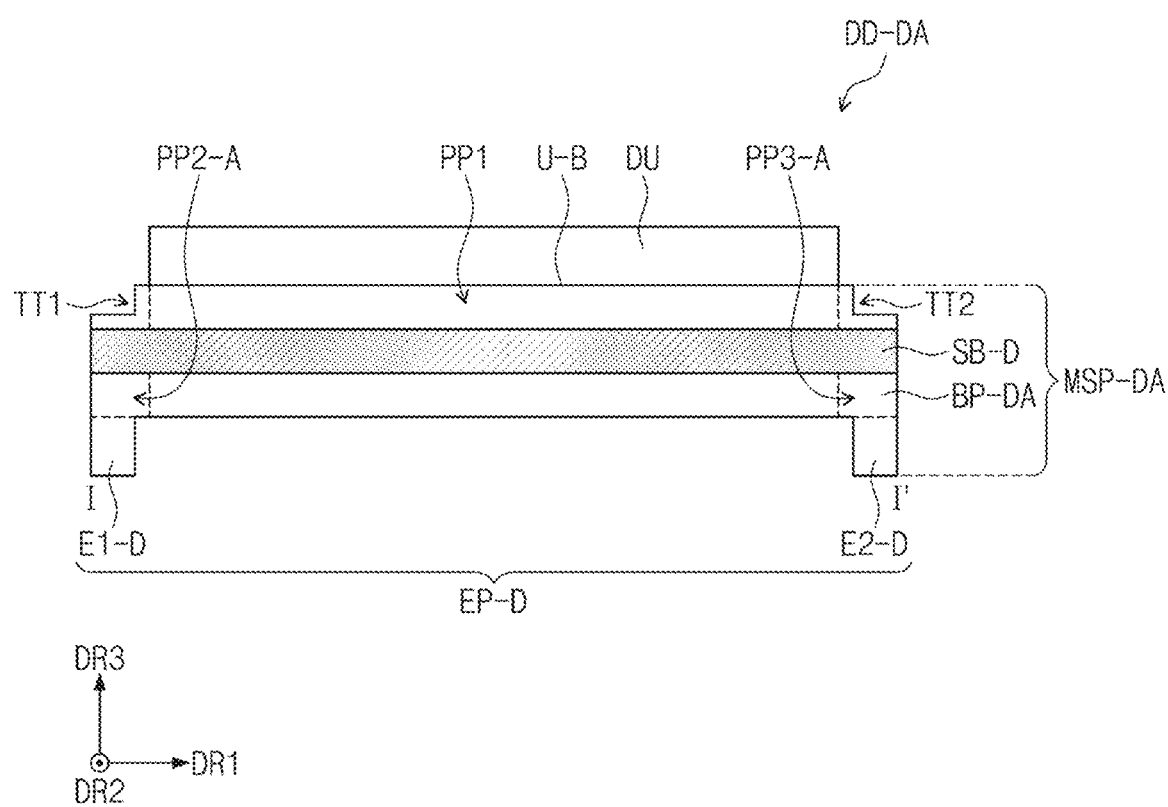
FIG. 10C is a cross-sectional view illustrating an embodiment of a display apparatus according to the inventive concept and taken along line I-I' of FIG. 10A.

Referring to FIG. 10C, the display apparatus DD-DA in an embodiment of the inventive concept may include a display unit DU and a support member MSP-DA. The support member MSP-DA may include support bars SB-D, a base part BP-DA, and a protruding part EP-D. The same or similar components as those described in FIGS. 10A to 10B will be designated by the same or similar reference numerals, respectively, and overlapped descriptions thereof will be omitted.

In the base part BP-DA in the embodiment, a first stepped portion TT1 and a second stepped portion TT2 may be defined.

The first stepped portion TT1 may be defined in a second portion PP2-A of the base part BP-DA. The first stepped portion TT1 may be provided as a portion of the base part BP-DA is removed from a top surface U-B of the base part BP-DA in a thickness direction. The first stepped portion TT1 may overlap a first support portion E1-D.

The second stepped portion TT2 may be defined in a third portion PP3-A of the base part BP-DA. The second stepped portion TT2 may be provided as a portion of the base part BP-DA is removed from the top surface U-B of the base part BP-DA in the thickness direction. The second stepped portion TT2 may overlap a second support portion E2-D.

Each of a side surface of the base part BP-DA, which defines the first stepped portion TT1, and a side surface of the base part BP-DA, which defines the second stepped portion TT2, may protrude from an edge of the display unit DU to the outside. However, the inventive concept is not limited thereto. In an embodiment, each of the side surface of the base part BP-DA, which defines the first stepped portion TT1, and the side surface of the base part BP-DA, which defines the second stepped portion TT2, may be aligned to the edge of the display unit DU, for example.

Although an entire top surface of each of the support bars SB-D is covered by the base part BP-DA as an example in FIG. 10C, the inventive concept is not limited thereto. In an embodiment, a portion of each of the support bars SB-D may be exposed by the first stepped portion TT1 and the second stepped portion TT2, for example.

According to the embodiment, as the first stepped portion TT1 and the second stepped portion TT2 are respectively defined in the second portion PP2-A and the third portion PP3-A that overlap the protruding part EP-D when the display apparatus DD-DA is rolled, the protruding part EP-D may be disposed in the first stepped portion TT1 and the second stepped portion TT2 when the display apparatus DD-DA is rolled. Thus, even when the protruding part EP-D has a thickness greater than that of the display unit DU, thickness increase of the display apparatus DD-DA may be minimized.

Figure 11A:
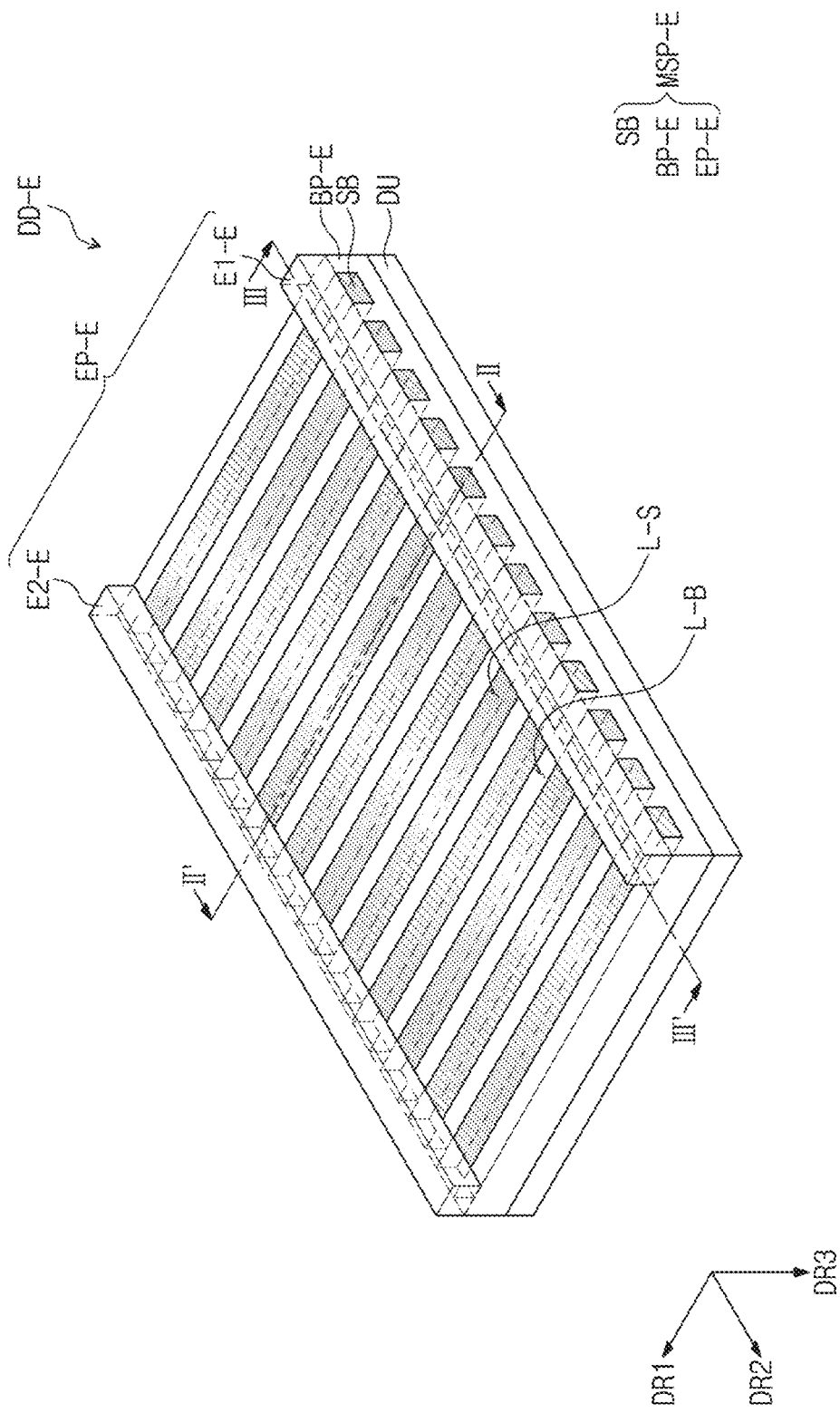
FIG. 11A is a perspective view illustrating an embodiment of a display apparatus according to the inventive concept.
Figure 11B:
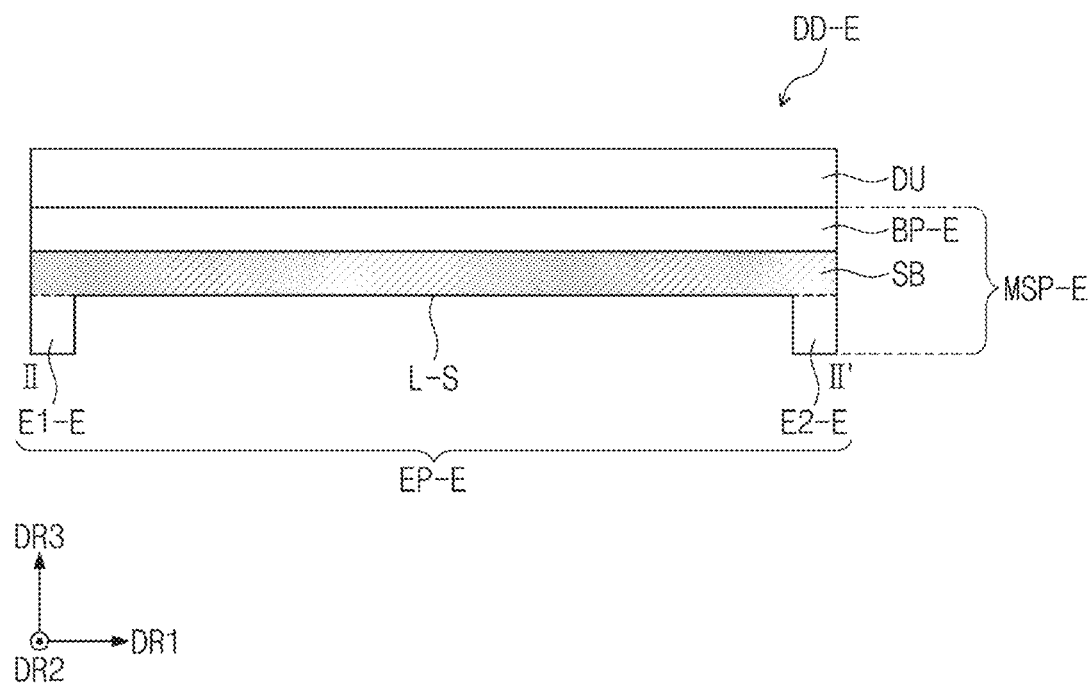
FIG. 11B is a cross-sectional view illustrating an embodiment of a display apparatus according to the inventive concept and taken along line II-II' of FIG. 11A.
Figure 11C:
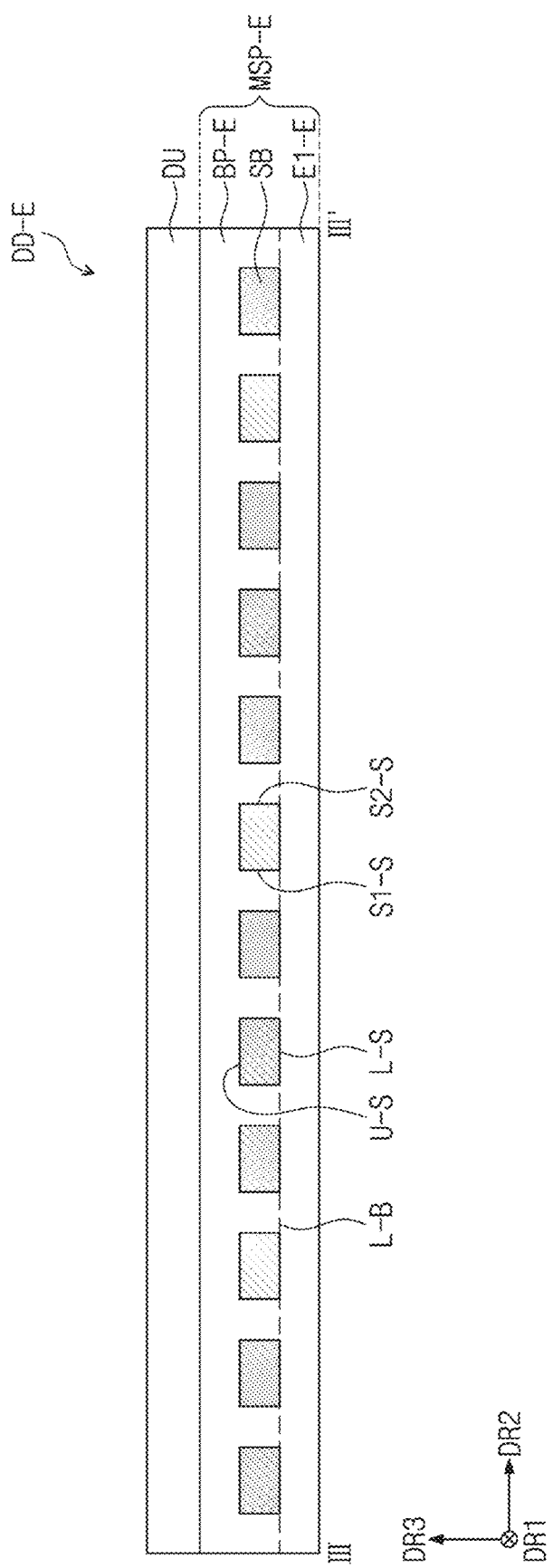
FIG. 11C is a cross-sectional view illustrating an embodiment of the display apparatus according to the inventive concept and taken along line III-III' of FIG. 11A.
Figure 11D:
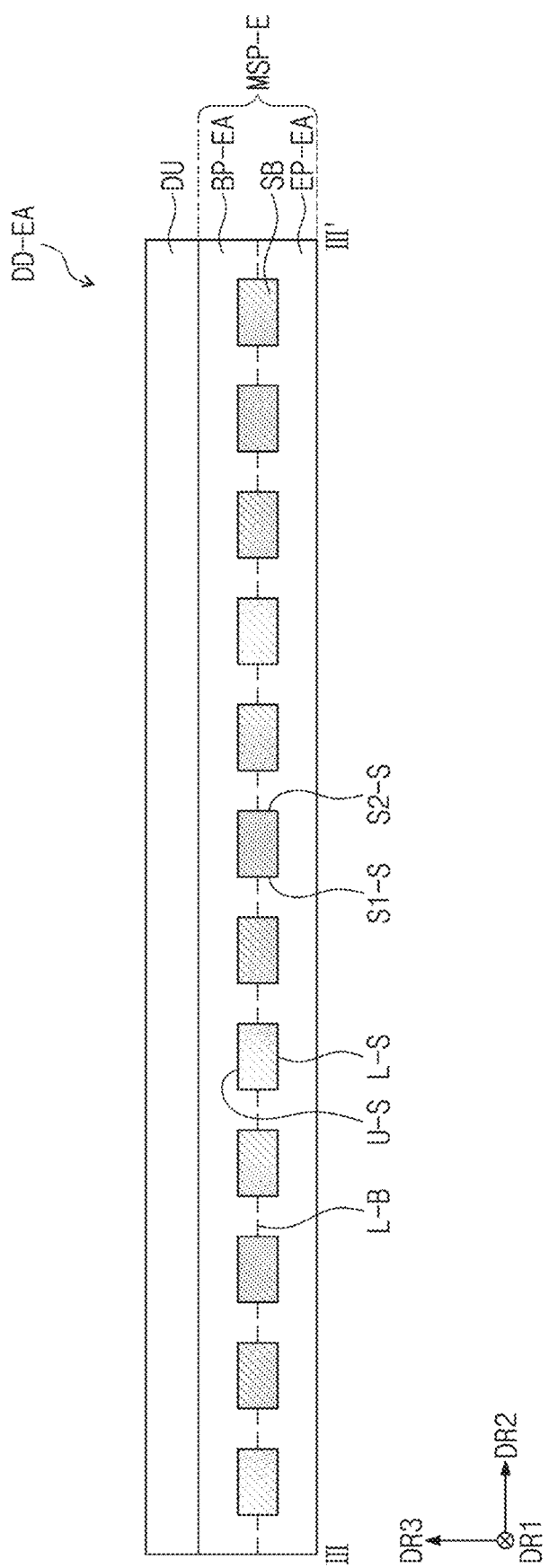
FIG. 11D is a cross-sectional view illustrating an embodiment of a display apparatus according to the inventive concept and taken along line III-III' of FIG. 11A.

FIG. 11A is a perspective view illustrating an embodiment of a display apparatus according to the inventive concept. FIG. 11B is a cross-sectional view illustrating an embodiment of a display apparatus DD-E according to the inventive concept and taken along line II-II' of FIG. 11A. FIG. 11C is a cross-sectional view illustrating an embodiment of a display apparatus according to the inventive concept and taken along line III-III' of FIG. 11A. FIG. 11D is a cross-sectional view illustrating a display apparatus in an embodiment of the inventive concept and taken along line III-III' of FIG. 11A. The same or similar components as those described in FIGS. 1A to 10C will be designated by the same or similar reference numerals, respectively, and overlapped description thereof will be omitted.

Referring to FIGS. 11A and 11C, a display apparatus DD-E in an embodiment of the inventive concept may include a display unit DU and a support member MSP-E. The support member MSP-E may include support bars SB, a base part BP-E, and a protruding part EP-E.

Each of the support bars SB may have a bar shape extending in the first direction DR1. In an embodiment, each of the support bars SB may have a quadrangular (e.g., rectangular) shape in a cross-section viewed in the first direction DR1, and each of the support bars SB may include a top surface U-S adjacent to the display unit DU, a bottom surface L-S opposed to the top surface U-S, and side surfaces S1-S and S2-S extending from long sides of the top surface U-S to long sides of the bottom surface L-S.

The base part BP-E in the embodiment may cover the top surface U-S and the side surfaces S1-S and S2-S of each of the support bars SB. That is, the base part BP-E may expose the bottom surface L-S of each of the support bars SB. In an embodiment, as illustrated in FIGS. 11B and 11C, a bottom surface L-B of the base part BP-E may be disposed on the same plane as the bottom surface L-S of each of the support bars SB, for example.

The protruding part EP-E may include a first support portion E1-E and a second support portion E2-E The protruding part EP-E in the embodiment may contact a portion of the bottom surface L-S of each of the support bars SB and protrude from the bottom surface L-B of the base part BP-E.

The first support portion E1-E may contact a portion adjacent to one end of the bottom surface L-S of each of the support bars SB. The second support portion E2-E may contact a portion adjacent to the other end of the bottom surface L-S of each of the support bars SB.

According to the embodiment, as a lower portion of the base part BP-E is partially removed, thickness increase due to the protruding part EP-E may be compensated, and thickness increase of the display apparatus DD-E in the rolled state may be minimized.

Referring to FIG. 11D, a base part BP-EA in the embodiment may expose a bottom surface L-S of each of support bars SB and a portion of side surfaces S1-S and S2-S. Thus, a protruding part EP-EA in the embodiment may contact the bottom surface L-S of each of support bars SB and the side surfaces S1-S and S2-S exposed by the base part BP-EA and protrude from a bottom surface L-B of the base part BP-EA.

The display apparatus in the embodiment of the inventive concept may include the support member for supporting the display panel, and the support member may include the support layer and the plurality of support bars disposed in the support layer. According to the embodiment of the inventive concept, as the support layer provides the space in which the support bars are bent, the impact force applied to the display apparatus may be reduced. Thus, in the embodiment of the inventive concept, the display apparatus having the improved impact resistance and the electronic apparatus including the same may be provided.

Although the embodiments of the invention have been described, it is understood that the invention should not be limited to these embodiments but various changes and modifications may be made by one ordinary skilled in the art within the spirit and scope of the invention as hereinafter claimed.

What is claimed is:
1. A display apparatus comprising:
a display panel which is rollable around a rolling axis extending in a first direction; and
a support member disposed below the display panel, the support member comprising:
a base part;
a plurality of support bars each extending in the first direction, arranged in a second direction crossing the first direction, and coupled to the base part; and
a protruding part comprising a first support portion and a second support portion, each of which is disposed below the base part and extends in the second direction,
wherein the first support portion and the second support portion are spaced apart from each other in the first direction,
the first support portion overlaps at least a portion of first ends of the plurality of support bars, and the second support portion overlaps at least a portion of second ends of the plurality of support bars, which are spaced apart from the first ends in the first direction, and
the protruding part overlaps the display panel.
2. The display apparatus of claim 1, wherein at least a portion of each of the plurality of support bars is disposed in the base part, and
the protruding part protrudes from the base part in a direction away from the display panel.
3. The display apparatus of claim 1, wherein each of the plurality of support bars has a top surface adjacent to the display panel and a bottom surface opposed to the top surface,
the bottom surface of each of the plurality of support bars is exposed from the base part, and
the protruding part contacts a portion of the bottom surface of each of the plurality of support bars and protrudes from the base part in a direction away from the display panel.
4. The display apparatus of claim 1, wherein each of the first support portion and the second support portion is provided in plural,
first support portions are spaced apart from each other in the second direction, and
second support portions are spaced apart from each other in the second direction.
5. The display apparatus of claim 1, wherein the first support portion comprises:
a first sub-portion having a first thickness; and
a second sub-portion having a second thickness less than the first thickness.
6. The display apparatus of claim 1, wherein the protruding part further comprises a third support portion and a fourth support portion, each of which is disposed below the base part and extends from the first support portion to the second support portion in the first direction, and
the third support portion and the fourth support portion are spaced apart from each other in the second direction.
7. The display apparatus of claim 6, wherein the protruding part has a rectangular ring shape.
8. The display apparatus of claim 1, wherein each of the plurality of support bars has a modulus greater than that of each of the base part and the protruding part.
9. The display apparatus of claim 1, wherein each of the plurality of support bars comprises at least one of metal, plastic, carbon fiber, and glass fiber, and
each of the base part and the protruding part comprises an elastomer.
10. The display apparatus of claim 1, wherein the base part and the protruding part have an integrated shape.
11. The display apparatus of claim 1, wherein the base part and the protruding part comprise different materials from each other.
12. The display apparatus of claim 1, further comprising:
a window disposed on the display panel;
an upper protection layer disposed between the window and the display panel; and
a lower protection layer disposed between the display panel and the support member.
13. A display apparatus comprising:
a display panel which is rollable around a rolling axis extending in a first direction; and
a support member disposed below the display panel, the support member comprising:
a base part;
a plurality of support bars each extending in the first direction, arranged in a second direction crossing the first direction, and coupled to the base part; and
a protruding part comprising a first support portion and a second support portion, each of which is disposed below the base part and extends in the second direction,
wherein the first support portion and the second support portion are spaced apart from each other in the first direction, the first support portion overlaps at least a portion of first ends of the plurality of support bars, and the second support portion overlaps at least a portion of second ends of the plurality of support bars, which are spaced apart from the first ends in the first direction, wherein the base part comprises:

a first portion overlapping the display panel; and a second portion and a third portion which are not in overlap with the display panel and spaced apart from each other with the first portion therebetween in the first direction, wherein the first support portion is disposed below the second portion and not in overlap with the display panel, and the second support portion is disposed below the third portion and not in overlap with the display panel.

14. The display apparatus of claim 13, wherein a first stepped portion obtained by removing a first portion of the base part from a top surface of the base part overlapping the first support portion in a thickness direction is defined in the second portion, and a second stepped portion obtained by removing a second portion of the base part from the top surface of the base part overlapping the second support portion in the thickness direction is defined in the third portion.

15. An electronic apparatus comprising:

a housing;

a roller disposed which is inside the housing and rotates around a rolling axis extending in a first direction;

a display apparatus comprising:

a display panel; and a support member disposed below the display panel, accommodated in the housing, and rollable around the roller, the support member comprising:

a base part;

a plurality of support bars each extending in the first direction, arranged in a second direction crossing the first direction, and coupled to the base part; and a protruding part comprising a first support portion and a second support portion, each of which is disposed below the base part and extends in the second direction; and a support plate disposed below the support member to support the display apparatus, wherein the first support portion and the second support portion are spaced apart from each other in the first direction, the first support portion overlaps at least a portion of first ends of the plurality of support bars, and the second support portion overlaps at least a portion of second ends of the plurality of support bars, which are spaced apart from the first ends in the first direction, and the base part and the support plate are spaced apart from each other to define an empty space.

16. The electronic apparatus of claim 15, wherein at least a portion of each of the plurality of support bars is disposed in the base part, and the protruding part protrudes from the base part in a direction away from the display panel.

17. The electronic apparatus of claim 15, wherein each of the plurality of support bars has a top surface adjacent to the display panel and a bottom surface opposed to the top surface, the bottom surface of each of the plurality of support bars is exposed from the base part, and the protruding part contacts a portion of the bottom surface of each of the plurality of support bars and protrudes from the base part in a direction away from the display panel.

18. The electronic apparatus of claim 15, wherein the base part comprises:

a first portion overlapping the display panel; and a second portion and a third portion which are not in overlap with the display panel and spaced apart from each other with the first portion therebetween in the first direction, wherein the first support portion is disposed below the second portion and not in overlap with the display panel, and the second support portion is disposed below the third portion and not in overlap with the display panel.

* * * * *